United States Patent

Nishizawa

(10) Patent No.: US 9,716,811 B2
(45) Date of Patent: Jul. 25, 2017

(54) METHOD AND APPARATUS FOR OBTAINING CROSS-SECTION OF COLOR GAMUT, AND RECORDING MEDIUM

(71) Applicant: KYOCERA Document Solutions Inc., Osaka-shi, Osaka (JP)

(72) Inventor: Akira Nishizawa, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/929,437

(22) Filed: Nov. 2, 2015

(65) Prior Publication Data

US 2016/0134784 A1 May 12, 2016

(30) Foreign Application Priority Data

Nov. 7, 2014 (JP) ................. 2014-226694

(51) Int. Cl.
*H04N 1/60* (2006.01)
*H04N 1/00* (2006.01)

(52) U.S. Cl.
CPC ......... *H04N 1/6061* (2013.01); *H04N 1/6066* (2013.01); *H04N 1/00023* (2013.01); *H04N 1/6033* (2013.01)

(58) Field of Classification Search
None
See application file for complete search history.

(56) References Cited

U.S. PATENT DOCUMENTS

| 5,872,898 | A | * | 2/1999 | Mahy | H04N 1/6058 358/1.9 |
| 6,421,142 | B1 | * | 7/2002 | Lin | H04N 1/6058 358/1.9 |
| 6,611,356 | B1 | * | 8/2003 | Shimizu | H04N 1/6058 358/1.9 |
| 6,618,499 | B1 | * | 9/2003 | Kohler | H04N 1/6058 358/518 |
| 7,177,465 | B1 | * | 2/2007 | Takahira | H04N 1/6058 358/1.9 |
| 7,397,588 | B2 | * | 7/2008 | Sloan | H04N 1/6058 345/601 |

(Continued)

FOREIGN PATENT DOCUMENTS

JP 2007281614 A 10/2007

*Primary Examiner* — Scott A Rogers

(57) ABSTRACT

This is a method for obtaining a cross-section of a color gamut of an image forming apparatus by slicing the color gamut along a plane. This method includes the steps of obtaining gamut boundary line segments, obtaining cross-section boundary line segments, and obtaining endpoints. The gamut boundary line-segment obtaining step is to obtain gamut boundary line segments serving as baseline segments of a boundary of the color gamut. The cross-section boundary line-segment obtaining step is to obtain cross-section boundary line segments serving as baseline segments of a boundary of the cross-section. The endpoints obtained in the endpoint obtaining step are points of intersection of the gamut boundary line segments and the plane. The cross-section boundary line segments obtained in the cross-section boundary line-segment obtaining step are line segments making up a route that is the shortest route passing through all the endpoints only once.

4 Claims, 18 Drawing Sheets

(56) References Cited

U.S. PATENT DOCUMENTS

| | | | |
|---|---|---|---|
| 7,755,817 B2* | 7/2010 | Ho | H04N 1/6058 358/1.9 |
| 7,982,927 B2* | 7/2011 | Sasaki | H04N 1/6058 358/1.9 |
| 8,054,504 B2* | 11/2011 | Mahy | H04N 1/54 358/1.9 |
| 8,837,828 B2* | 9/2014 | Kang | G09G 5/02 382/167 |
| 2006/0170999 A1* | 8/2006 | Sloan | H04N 1/6058 358/520 |
| 2009/0009787 A1* | 1/2009 | Mahy | H04N 1/54 358/1.9 |
| 2011/0043834 A1* | 2/2011 | Tomita | H04N 1/6075 358/1.9 |

* cited by examiner

METHOD AND APPARATUS FOR OBTAINING CROSS-SECTION OF COLOR GAMUT, AND RECORDING MEDIUM

INCORPORATION BY REFERENCE

The disclosure of Japanese Patent Application No. 2014-226694 filed on Nov. 7, 2014 including the specification, drawings and abstract is incorporated herein by reference in its entirety.

BACKGROUND

This disclosure relates to a method and an apparatus for obtaining a cross-section of a color gamut of an image forming apparatus by slicing the color gamut along a plane, and a non-transitory computer-readable recording medium storing a program for obtaining a cross-section of a color gamut.

A conventionally well-known method for obtaining a cross-section of a color gamut of a printer by slicing the color gamut along a plane at a constant lightness level includes firstly obtaining line segments serving as a baseline of a boundary of the color gamut of the printer, and then obtaining points of intersection of the obtained line segments and the plane at the constant lightness level (e.g., see Patent Literature 1). The color-gamut cross-section obtaining method disclosed in Patent Literature 1 also includes taking the average of all the obtained intersection points to obtain a center point having the average value, calculating the angle of a line segment connecting the center point and each of the intersection point, and thereby obtaining a cross-section based on the line segments connecting the intersection points in decreasing order of the angle.

SUMMARY

One aspect of the present disclosure directs to a method for obtaining a cross-section of a color gamut of an image forming apparatus by slicing the color gamut along a plane. The method for obtaining a cross-section of a color gamut includes a step of obtaining gamut boundary line segments, a step of obtaining cross-section boundary line segments, and a step of obtaining endpoints. The step of obtaining gamut boundary line segments is to obtain gamut boundary line segments that are baseline segments of a boundary of the color gamut. The step of obtaining cross-section boundary line segments is to obtain cross-section boundary line segments that are baseline segments of a boundary of the cross-section. The step of obtaining endpoints is to obtain endpoints for the cross-section boundary line segments. The endpoints obtained in the endpoint obtaining step are points of intersection of the gamut boundary line segments obtained in the gamut boundary line-segment obtaining step and the plane. The cross-section boundary line segments obtained in the cross-section boundary line-segment obtaining step are line segments making up a route that is the shortest route passing through all the endpoints, which are obtained in the endpoint obtaining step, only once.

Another aspect of the present disclosure directs to an apparatus for obtaining a cross-section of a color gamut of an image forming apparatus by slicing the color gamut along a plane. The apparatus includes a gamut boundary line-segment obtaining unit, a cross-section boundary line-segment obtaining unit, and an endpoint obtaining unit. The gamut boundary line-segment obtaining unit obtains gamut boundary line segments that are baseline segments of a boundary of the color gamut. The cross-section boundary line-segment obtaining unit obtains cross-section boundary line segments that are baseline segments of a boundary of the cross-section. The endpoint obtaining unit obtains endpoints for the cross-section boundary line segments. The endpoints obtained by the endpoint obtaining unit are points of intersection of the gamut boundary line segments obtained by the gamut boundary line-segment obtaining unit and the plane. The cross-section boundary line segments obtained by the cross-section boundary line-segment obtaining unit are line segments making up a route that is the shortest route passing through all the endpoints, which are obtained by the endpoint obtaining unit, only once.

Still another aspect of the present disclosure directs to a non-transitory computer-readable recording medium that can store a computer-executable program for obtaining a cross-section of a color gamut. The color-gamut cross-section obtaining program is executed to obtain a cross-section of a color gamut of an image forming apparatus by slicing the color gamut along a plane. The color-gamut cross-section obtaining program enables a computer to function as a gamut boundary line-segment obtaining unit that obtains gamut boundary line segments serving as baseline segments of a boundary of the color gamut, a cross-section boundary line-segment obtaining unit that obtains cross-section boundary line segments serving as baseline segments of a boundary of the cross-section, and an endpoint obtaining unit that obtains endpoints for the cross-section boundary line segments. The endpoints obtained by the endpoint obtaining unit are points of intersection of the gamut boundary line segments obtained by the gamut boundary line-segment obtaining unit and the plane. The cross-section boundary line segments obtained by the cross-section boundary line-segment obtaining unit are line segments making up a route that is the shortest route passing through all the endpoints, which are obtained by the endpoint obtaining unit, only once.

DETAILED DESCRIPTION

With reference to the accompanying drawings, an embodiment of the present disclosure will be described below.

First of all, the configuration of an In/Out-of-gamut determination system according to the embodiment will be described.

Figure 1:
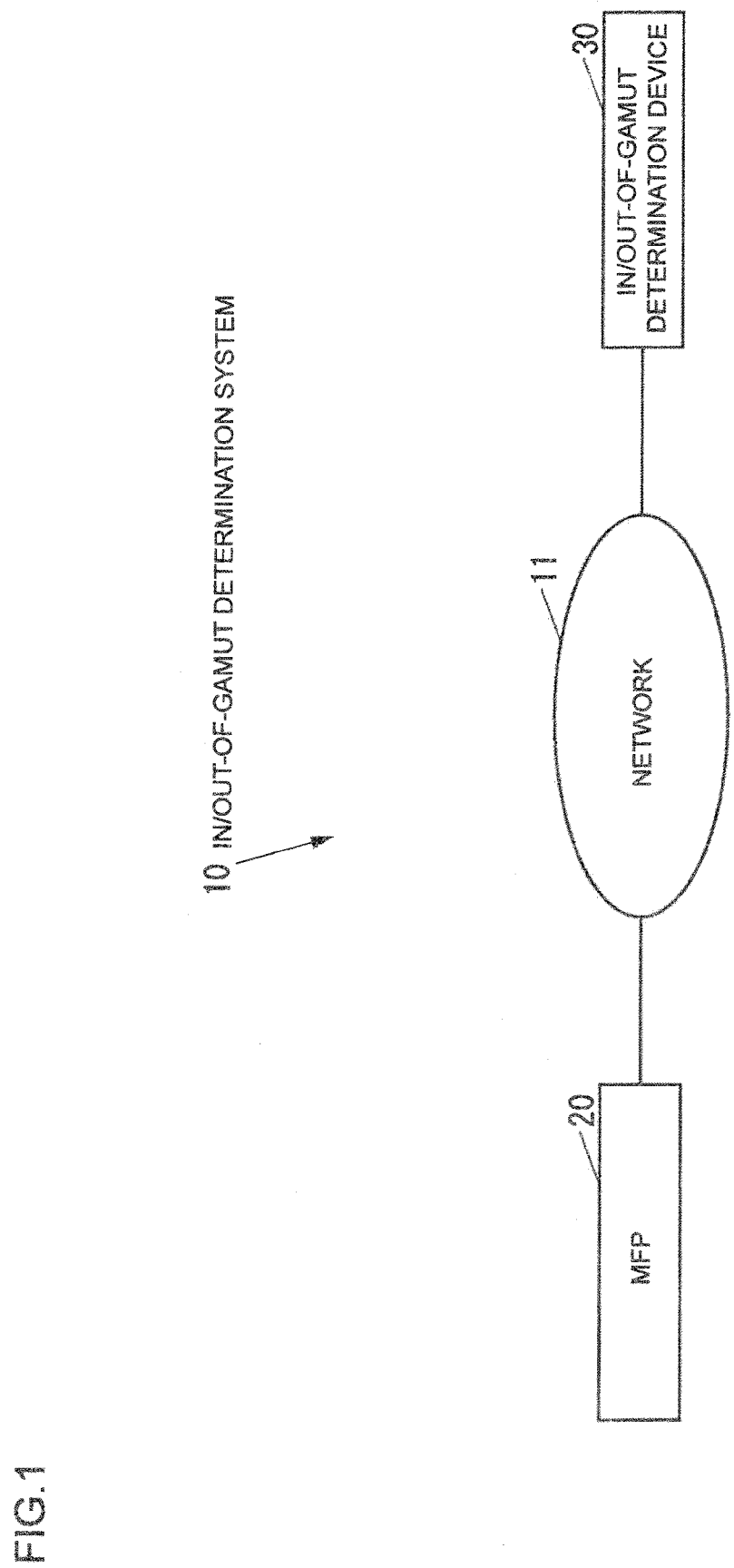
FIG. 1 is a block diagram of an In/Out-of-gamut determination system according to an embodiment of the disclosure.

FIG. 1 is a block diagram of the In/Out-of-gamut determination system 10 according to the embodiment.

As shown in FIG. 1, the In/Out-of-gamut determination system 10 includes a multi-function peripheral (MFP) 20 as an image forming apparatus and an In/Out-of-gamut determination device 30 for determining whether a specified chromaticity value is inside or outside a color gamut of the MFP 20. The MFP 20 and In/Out-of-gamut determination device 30 are connected through a network 11, such as a local area network (LAN) and the Internet, so as to communicate with each other.

Chromaticity values are values representing colors in a device-independent color space, such as an XYZ color space and a Lab color space. The embodiment below will be described with the Lab color space as a typical color space; however, the XYZ color space or other device-independent color spaces are also applicable.

Figure 2:
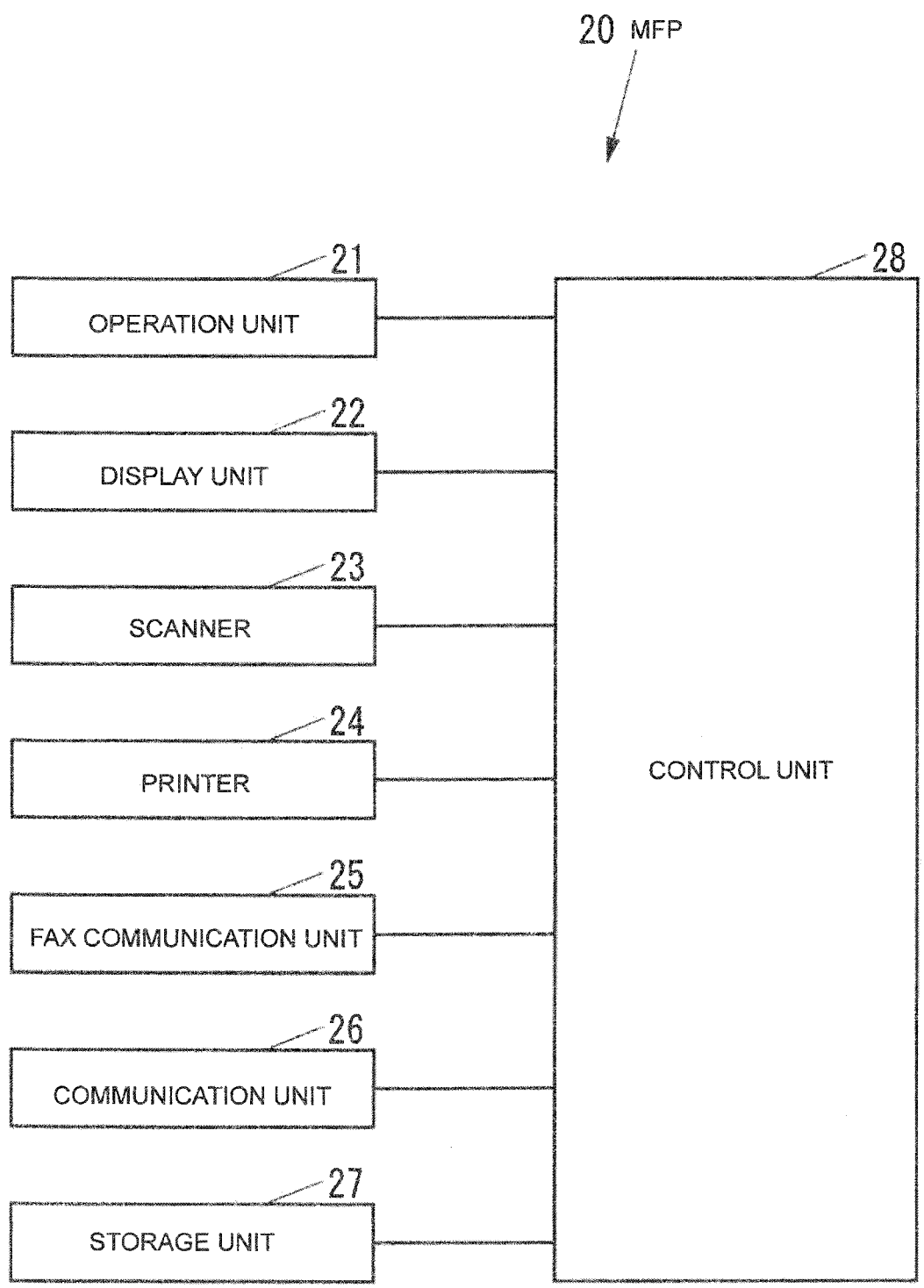
FIG. 2 is a block diagram of an MFP shown in FIG. 1.

FIG. 2 is a block diagram of the MFP 20.

As shown in FIG. 2, the MFP 20 includes an operation unit 21 that is an input device, such as a button, through which various operational instructions are input, a display unit 22 that is a display device, such as a liquid crystal display (LCD), used to display various items of information, a scanner 23 that is a reading device to read images, a printer 24 that is a printing device that performs print operation on recording media such as paper, a fax communication unit 25 that is a facsimile device to perform fax communication with external facsimile devices (not shown) via a communication line, such as a public telephone line, a communication unit 26 that is a communication device to communicate with external devices, such as the In/Out-of-gamut determination device 30 (see FIG. 1), via the network 11 (see FIG. 1), a storage unit 27 that is a storage device, such as an electrically erasable programmable read only memory (EEPROM) and a hard disk drive (HDD), and stores various types of data, and a control unit 28 that controls the entire MFP 20.

The control unit 28 includes, for example, a central processing unit (CPU), a read only memory (ROM), which stores programs and various types of data, and a random access memory (RAM), which is used as a work area for the CPU. The CPU runs the programs stored in the ROM or the storage unit 27.

Figure 3:
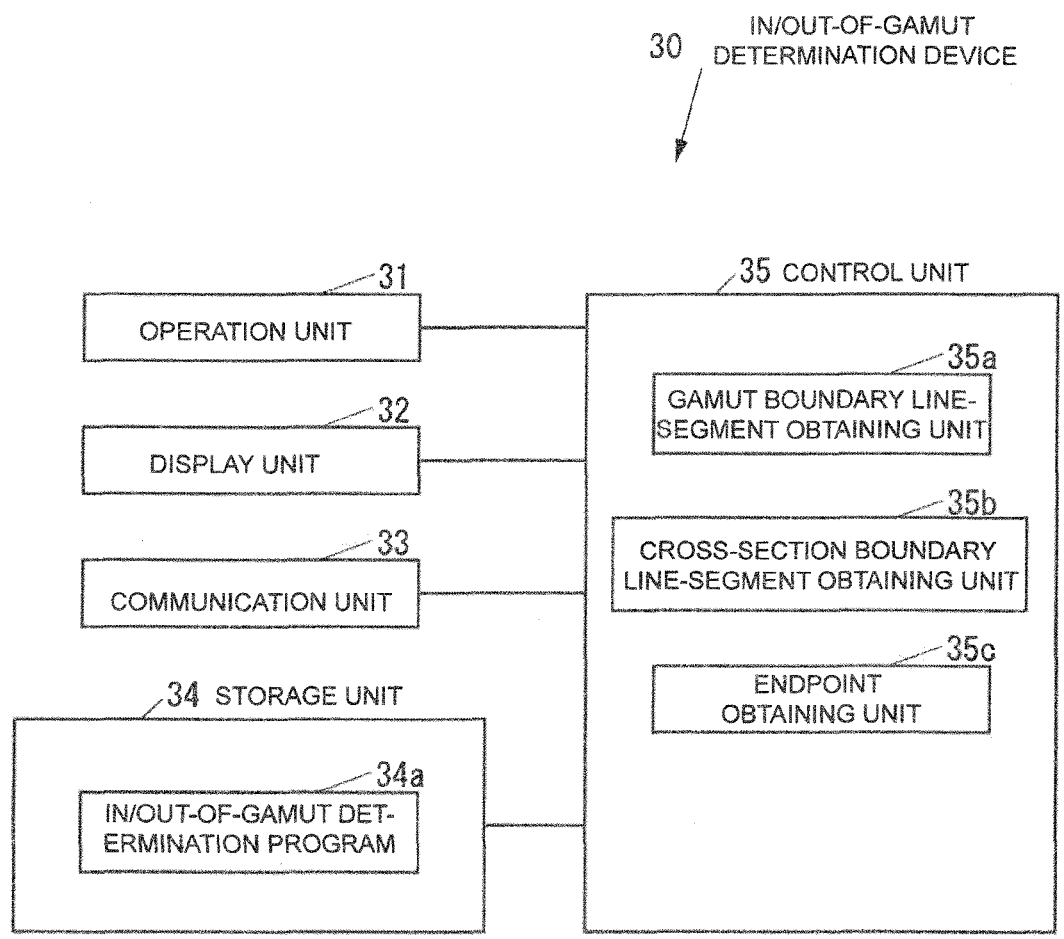
FIG. 3 is a block diagram of an In/Out-of-gamut determination device shown in FIG. 1.

FIG. 3 is a block diagram of the In/Out-of-gamut determination device 30.

As shown in FIG. 3, the In/Out-of-gamut determination device 30 includes an operation unit 31 that is an input device, such as a mouse and a keyboard, through which various operational instructions are input, a display unit 32 that is a display device, such as an LCD, to display various items of information, a communication unit 33 that is a communication device communicating with external apparatuses, such as the MFP 20 (see FIG. 1), via the network 11 (see FIG. 1), a storage unit 34 that is a storage device, such as a HDD, storing programs and various types of data, and a control unit 35 that controls the entire In/Out-of-gamut determination device 30. The In/Out-of-gamut determination device 30 is implemented by a computer, for example, a personal computer (PC).

The storage unit 34 stores an In/Out-of-gamut determination program 34a used to determine whether a specified chromaticity value is inside or outside the color gamut of the MFP 20. The In/Out-of-gamut determination program 34a may be installed in the In/Out-of-gamut determination device 30 during a manufacturing process of the In/Out-of-gamut determination device 30, may be installed additionally from a storage medium, such as a compact disk (CD), digital versatile disk (DVD), and universal serial bus (USB) memory, or may be additionally installed through the network 11.

The control unit 35 includes, for example, a CPU, a ROM with preinstalled programs and various types of data, and a RAM used as a work area for the CPU. The CPU runs the programs stored in the ROM or the storage unit 34.

The control unit 35 executes the In/Out-of-gamut determination program 34a stored in the storage unit 34 to function as a gamut boundary line-segment obtaining unit 35a that obtains gamut boundary line segments serving as baseline segments of the boundary of the color gamut of the MFP 20, that is, the outermost surfaces of the color gamut, a cross-section boundary line-segment obtaining unit 35b that obtains cross-section boundary line segments serving as baseline segments of the boundary of a cross-section (hereinafter, referred to as "cross-section boundary") taken by slicing the color gamut of the MFP 20 along a plane, and an endpoint obtaining unit 35c that obtains endpoints of the cross-section boundary line segments. The In/Out-of-gamut determination program 34a is part of a color-gamut cross-section obtaining program executed to obtain a cross-section of the color gamut of the MFP 20 by slicing the color gamut along a plane. In addition, the In/Out-of-gamut determination device 30 is part of a color-gamut cross-section obtaining apparatus that obtains a cross-section of the color gamut of the MFP 20 by slicing the color gamut along a plane.

The following is a description about operation of the In/Out-of-gamut determination system 10.

Figure 4:
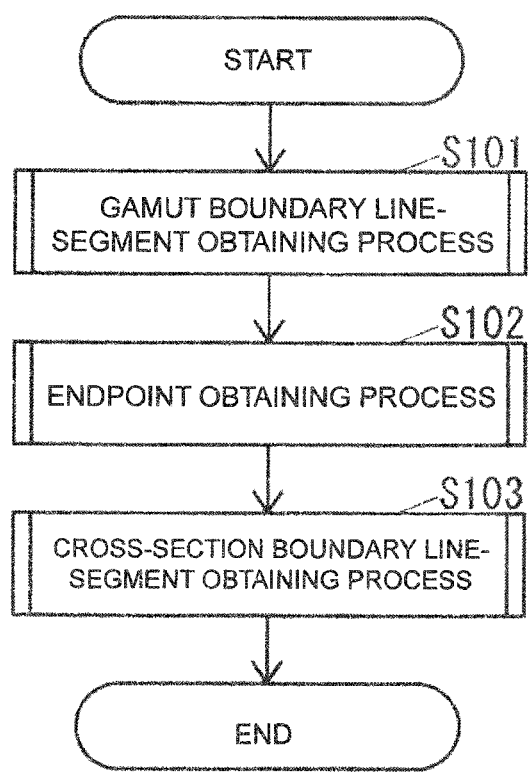
FIG. 4 is a flowchart of operation when the In/Out-of-gamut determination device shown in FIG. 3 obtains a cross-section of a color gamut of the MFP.

FIG. 4 is a flowchart of the operation of the In/Out-of-gamut determination device 30 when obtaining a cross-section of the color gamut of the MFP 20.

As shown in FIG. 4, the gamut boundary line-segment obtaining unit 35a performs a gamut boundary line-segment obtaining process for obtaining gamut boundary line segments (S101).

Figure 5:
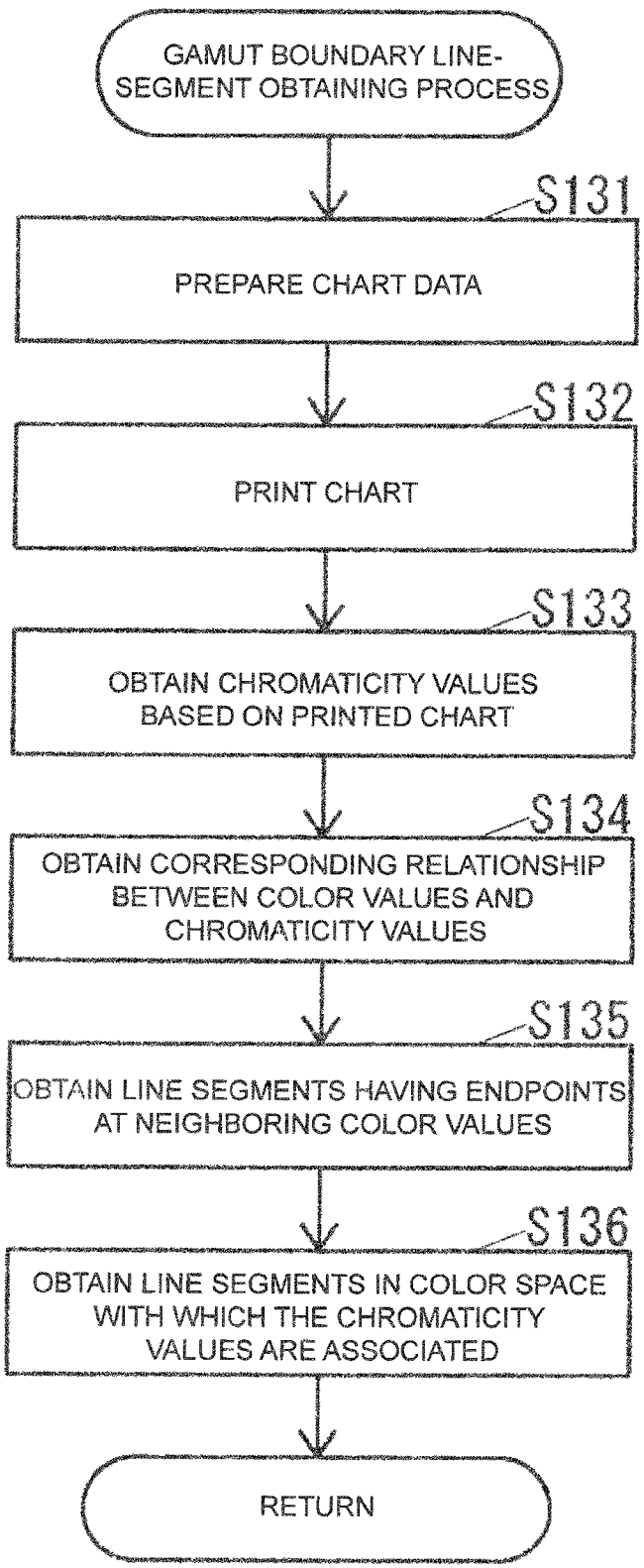
FIG. 5 is a flowchart of a gamut boundary line-segment obtaining process shown in FIG. 4.

FIG. 5 is a flowchart of the gamut boundary line-segment obtaining process shown in FIG. 4.

As shown in FIG. 5, the gamut boundary line-segment obtaining unit 35a prepares data of a chart to be printed by the MFP 20 (S131). The chart contains patches of different colors to be printed by the MFP 20. The data of the chart represents the colors of patches by color values to be input into the MFP 20. The gamut boundary line-segment obtaining unit 35a prepares data of a chart containing at least patches of colors on the outermost surfaces of the color gamut of the MFP 20 in S131. This means that the gamut boundary line-segment obtaining unit 35a may prepare data of a chart containing patches of the colors on the outermost surfaces of the color gamut of the MFP 20 in S131, or may prepare data of a chart containing patches of the colors on the outermost surfaces of the color gamut of the MFP 20 and patches of colors other than the colors on the outermost surfaces of the color gamut of the MFP 20 in S131.

The color values are values representing colors in device-dependent color spaces, such as an RGB color space and a CMYK color space. Well-known color spaces to which the color values input to many image forming apparatuses belong include an RGB color space and a CMYK color space. In the following description, the RGB color space is used as a typical color space; however, the CMYK color space or other device-dependent color spaces are also applicable.

A description will be given of the gamut boundary line-segment obtaining unit 35a that prepares data of a chart containing only patches of colors on the outermost surfaces of the color gamut of the MFP 20 in S131.

In a case where the color space for color values input into the MFP 20 is an RGB color space, if any one of an R channel, a G channel, and a B channel represented by RGB values is set to the minimum value or the maximum value within an input range, the remaining channels may take on any values, but the values appear as points on the outermost surfaces of the color gamut.

Figure 6:
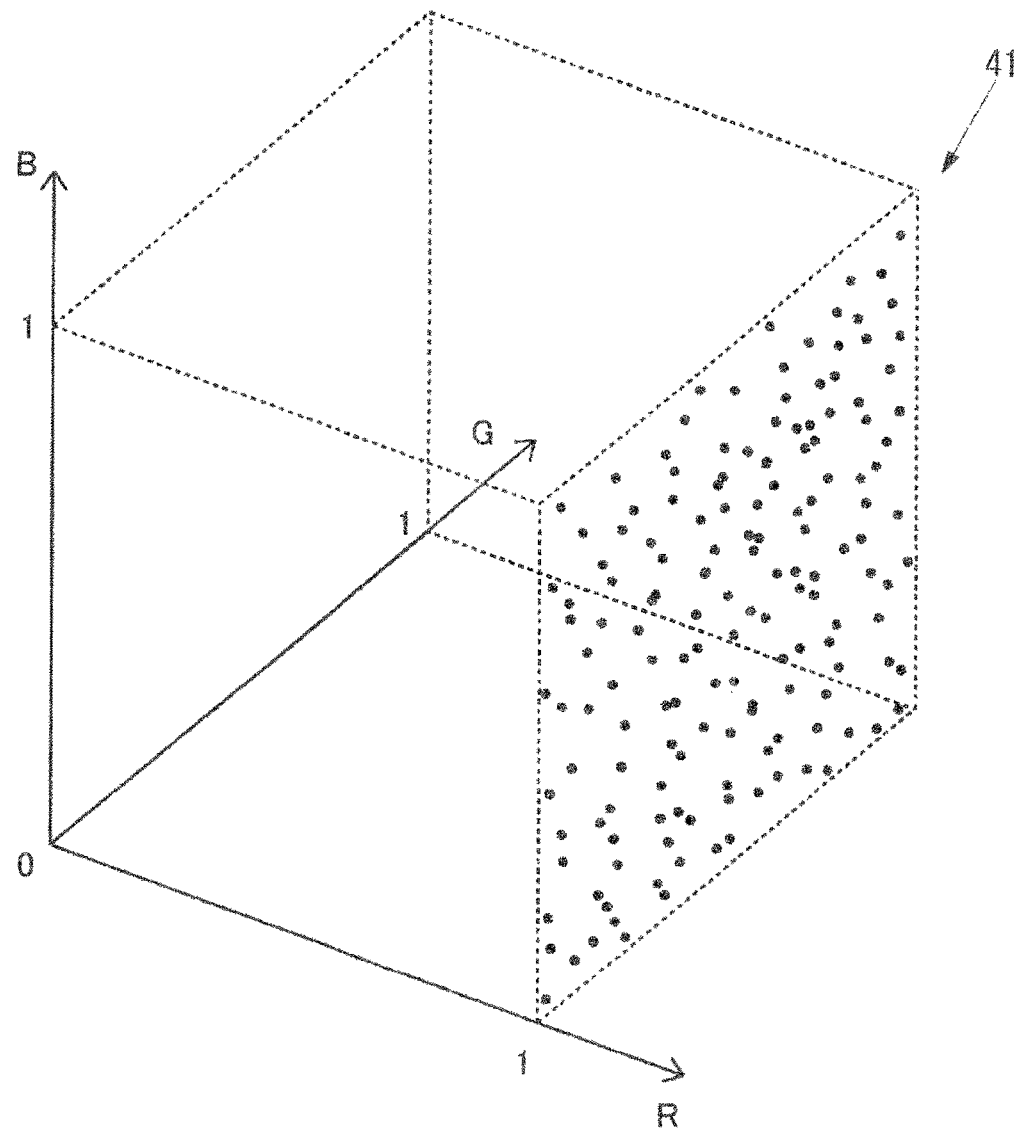
FIG. 6 shows an example of a set of points, when an R-value is 1 and G- and B-values are random values, out of points on the outermost surfaces of the color gamut of the MFP in FIG. 2.

If the input range is from 0 to 1, for example, the gamut boundary line-segment obtaining unit 35a sets any one of the R, G, and B channels to 0, which is the minimum value within the input range, or to 1, which is the maximum value within the input range, and the remaining channels take on randomly extracted values. A set of points may be generated on the outermost surfaces of the color gamut by combining the extracted values. FIG. 6 shows an example of a set of points 41 with the R-value of 1 and the G- and B-values of random values, out of points on the outermost surfaces of the color gamut. FIG. 6 indicates only the points with the R-value of 1 out of the points on the outermost surfaces of the color gamut; however, similar point distributions will be seen even if the R-value is 0, the G-value is 1 or 0, or the B-value is 0 or 1.

Figure 7:
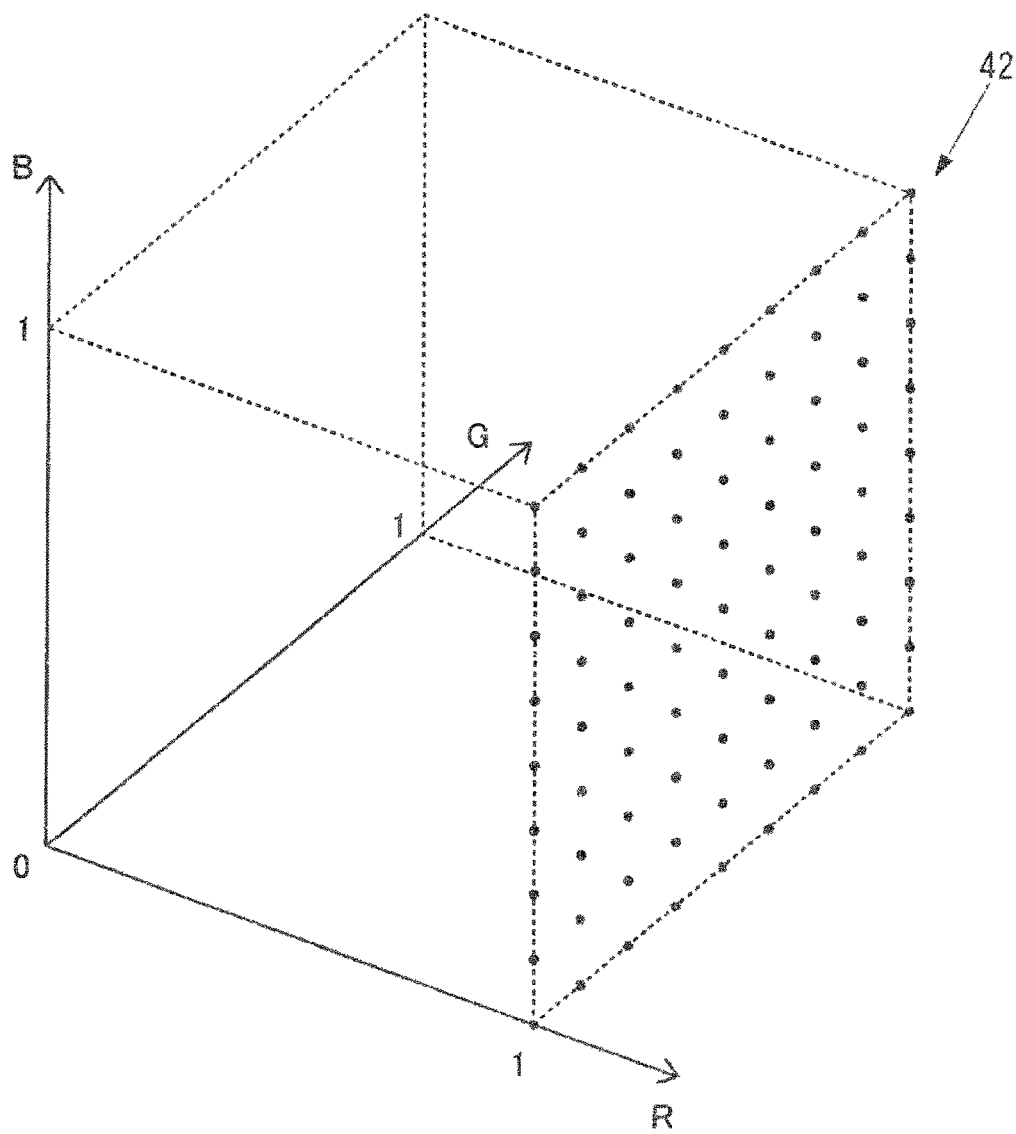
FIG. 7 shows an example of a set of points, when an R-value is 1 and G- and B-values are values obtained by dividing an input range into eight equal parts on the boundary, out of points on the outermost surfaces of the color gamut of the MFP in FIG. 2.

If the input range is from 0 to 1, for example, the gamut boundary line-segment obtaining unit 35a sets any one of the R, G, and B channels to 0, which is the minimum value within the input range, or to 1, which is the maximum value within the input range, and the remaining channels take on equally-spaced extracted values. A set of points may be generated on the outermost surface of the color gamut by combining the extracted values. FIG. 7 shows an example of a set of points 42 with the R-value of 1 and the G- and B-values obtained by dividing the input range into eight equal parts on the boundary, out of points on the outermost surfaces of the color gamut. Specifically, the G- and B-values are any of 0, $\frac{1}{8}$, $\frac{1}{4}$, $\frac{3}{8}$, $\frac{1}{2}$, $\frac{5}{8}$, $\frac{3}{4}$, $\frac{7}{8}$, and 1. FIG. 7 indicates only the points with the R-value of 1 out of the points on the outermost surfaces of the color gamut; however, similar point distributions will be seen even if the R-value is 0, the G-value is 1 or 0, or the B-value is 0 or 1. The input range is divided into eight equal parts in this example, but can be divided into any desired number of equal parts.

Next, a description will be given of the gamut boundary line-segment obtaining unit 35a that prepares data of a chart containing patches of colors on the outermost surfaces of the color gamut of the MFP 20 and patches of colors other than the colors on the outermost surfaces of the color gamut of the MFP 20 in S131.

The gamut boundary line-segment obtaining unit 35a can prepare data of an already-existing chart prepared to grasp the entire color gamut of the MFP 20 for the data of a chart containing patches of colors on the outermost surfaces of the color gamut of the MFP 20 and patches of colors other than the colors on the outermost surfaces of the color gamut of the MFP 20.

Alternatively, the gamut boundary line-segment obtaining unit 35a can generate data of a chart containing patches of colors on the outermost surfaces of the color gamut of the MFP 20 and patches of colors other than the colors on the outermost surfaces of the color gamut of the MFP 20. For example, the gamut boundary line-segment obtaining unit 35a may randomly extract values for the R, G, and B channels and combine the extracted values to generate data of a chart containing patches of colors on the outermost surfaces of the color gamut of the MFP 20 and patches of colors other than the colors on the outermost surfaces of the color gamut of the MFP 20. Alternatively, the gamut boundary line-segment obtaining unit 35a may equidistantly extract values for the R, G, and B channels and combine the equally-spaced extracted values to generate data of a chart containing patches of colors on the outermost surfaces of the color gamut of the MFP 20 and patches of colors other than the colors on the outermost surfaces of the color gamut of the MFP 20.

After the process in S131, the gamut boundary line-segment obtaining unit 35a causes the printer 24 to print a chart corresponding to the data prepared in S131 (S132).

The colors of the chart printed in S132 are measured, and thus the gamut boundary line-segment obtaining unit 35a obtains Lab values, which are chromaticity values, of the patches of colors on the outermost surfaces of the color gamut of the MFP 20 out of the patches of the chart printed in S132 (S133). The gamut boundary line-segment obtaining unit 35a can evaluate the corresponding relationships between the chromaticity values and the color values of the patches based on the chart data prepared in S131. Thus, the gamut boundary line-segment obtaining unit 35a can determine which colors of the patches correspond to the colors on the outermost surfaces of the color gamut of the MFP 20 based on the color values in the chart data prepared in S131.

After S133, the gamut boundary line-segment obtaining unit 35a stores the corresponding relationships between the color values and chromaticity values for the colors on the outermost surfaces of the color gamut of the MFP 20, based on the color values of the chart data prepared in S131 and the chromaticity values obtained in S133 (S134).

Figure 8:
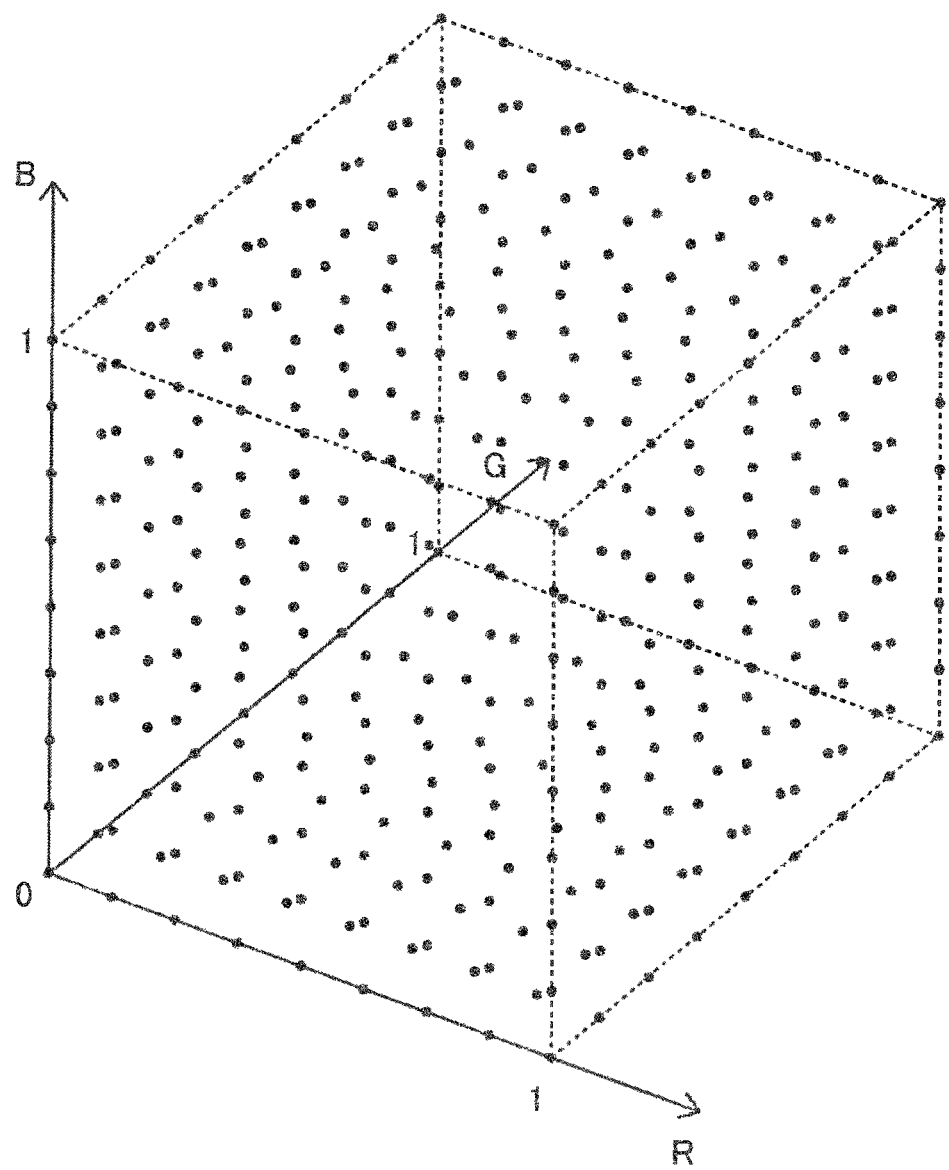
FIG. 8 shows an example of points on the outermost surfaces of the color gamut of the MFP in FIG. 2.
Figure 9:
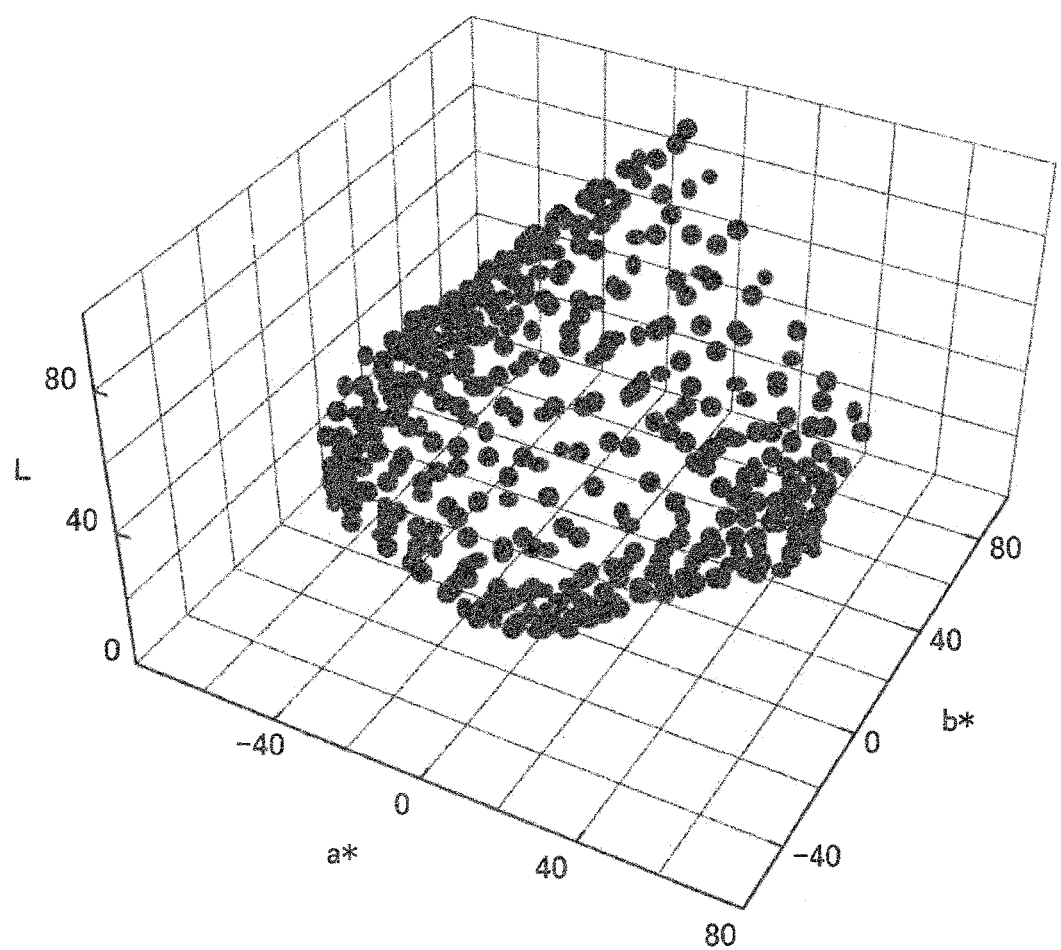
FIG. 9 shows an example of points in a Lab color space, corresponding to the points in FIG. 8.

For example, if a chart containing patches of colors corresponding to the color values on the outermost surfaces of the color gamut of the MFP 20 shown in FIG. 8 is printed by the printer 24 in S132, the chromaticity values obtained in S133 are rendered in a Lab color space as shown in FIG. 9. FIG. 8 represents colors having an R-value of 0 or 1 and G- and B-values of $\frac{1}{8}$, $\frac{1}{4}$, $\frac{3}{8}$, $\frac{1}{2}$, $\frac{5}{8}$, $\frac{3}{4}$, $\frac{7}{8}$, or 1, colors having a G-value of 0 or 1 and R- and B-values of 0, $\frac{1}{8}$, $\frac{1}{4}$, $\frac{3}{8}$, $\frac{1}{2}$, $\frac{5}{8}$, $\frac{3}{4}$, $\frac{7}{8}$, or 1, and colors having a B-value of 0 or 1 and R- and G-values of 0, $\frac{1}{8}$, $\frac{1}{4}$, $\frac{3}{8}$, $\frac{1}{2}$, $\frac{5}{8}$, $\frac{3}{4}$, $\frac{7}{8}$, or 1.

After S134, the gamut boundary line-segment obtaining unit 35a obtains line segments for the color values stored in S134. The line segments have one endpoint at a color value and the other endpoint at a neighboring color value (S135).

A description is given of how to obtain line segments when the color values stored in S134 are equally spaced.

Adoptable methods to obtain line segments for the equidistant color values stored in S134 include, for example, a method of obtaining line segments based on the arrangement of color values stored in S134, and a method of obtaining line segments by forming polygons with the points of color values stored in S134.

The method of obtaining line segments based on the arrangement of the color values stored in S134 will be firstly described.

This method will be described on the assumption that the color values stored in S134 are color values shown in FIG. 8.

For example, when an R-value is 0, each of the G- and B-values is any of 0, $\frac{1}{8}$, $\frac{1}{4}$, $\frac{3}{8}$, $\frac{1}{2}$, $\frac{5}{8}$, $\frac{3}{4}$, $\frac{7}{8}$, and 1.

Figure 10A:
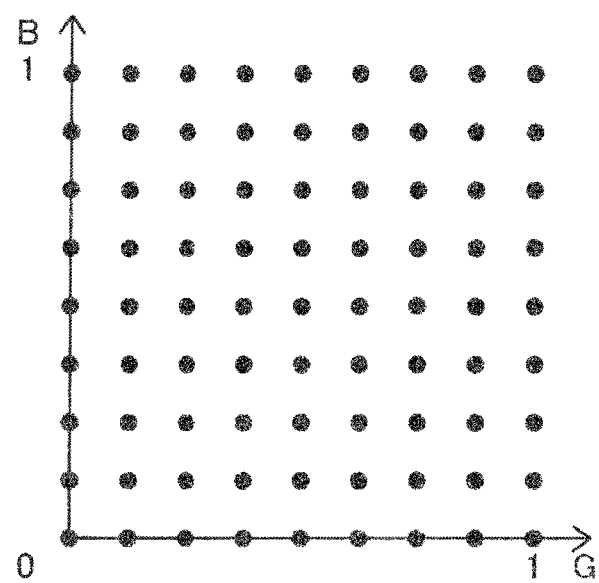
FIG. 10A illustrates color values having an R-value of 0, out of the color values in FIG. 8.

FIG. 10A illustrates color values having an R-value of 0, but not other color values in FIG. 8.

In FIG. 10A, the G-values of 0, $\frac{1}{8}$, $\frac{1}{4}$, $\frac{3}{8}$, $\frac{1}{2}$, $\frac{5}{8}$, $\frac{3}{4}$, $\frac{7}{8}$, and 1 are represented as the 1st row, the 2nd row, the 3rd row, the 4th row, the 5th row, the 6th row, the 7th row, the 8th row, and the 9th row, respectively. Similarly, the B-values of 0, $\frac{1}{8}$, $\frac{1}{4}$, $\frac{3}{8}$, $\frac{1}{2}$, $\frac{5}{8}$, $\frac{3}{4}$, $\frac{7}{8}$, and 1 are represented as the 1st column, the 2nd column, the 3rd column, the 4th column, the 5th column, the 6th column, the 7th column, the 8th column, and the 9th column, respectively. For example, a color having a G-value of $\frac{1}{8}$ and a B-value of $\frac{3}{8}$ can be represented as "a color in the 2nd row and the 4th column".

Figure 10B:
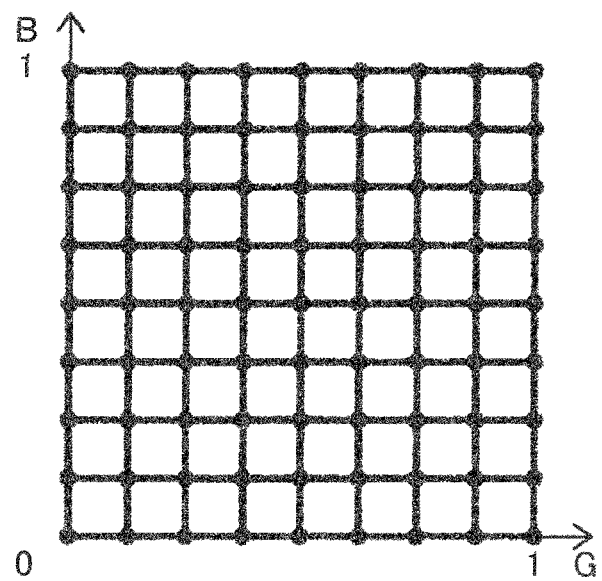
FIG. 10B shows an example of a pattern of line segments obtained in association with the color values in FIG. 10A.

The gamut boundary line-segment obtaining unit 35a may obtain line segments indicated with thick lines, as shown in FIG. 10B, in S135. Specifically, the gamut boundary line-segment obtaining unit 35a may obtain "line segments having an endpoint at a color value in the ith row and jth column and an endpoint at a color value in the (i+1)th row and jth column", and "line segments having an endpoint at a color value in the ith row and jth column and an endpoint at a color value in the ith row and (j+1)th column" in S135. In this description, the "i" and "j" are 1, 2, . . . 7, or 8.

Figure 11A:
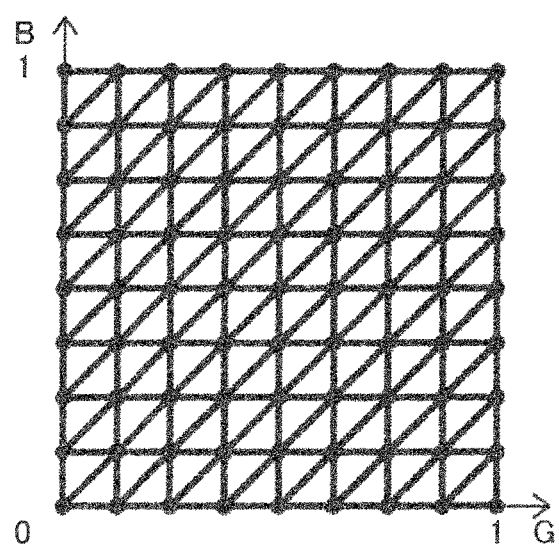
FIG. 11A shows an example of a pattern of line segments obtained in association with the color values in FIG. 10A, the pattern being different from the pattern in FIG. 10B.

The gamut boundary line-segment obtaining unit 35a may obtain line segments indicated with thick lines, as shown in FIG. 11A, in S135. Specifically, the gamut boundary line-segment obtaining unit 35a may obtain "line segments having an endpoint at a color value in the ith row and jth column and an endpoint at a color value in the (i+1)th row and jth column", "line segments having an endpoint at a color value in the ith row and jth column and an endpoint at a color value in the ith row and (j+1)th column", and "line segments having an endpoint at a color value in the ith row and jth column and an endpoint at a color value in the (i+1)th row and (j+1)th column" in S135. In this description, the "i" and "j" are 1, 2, . . . 7, or 8.

Figure 11B:
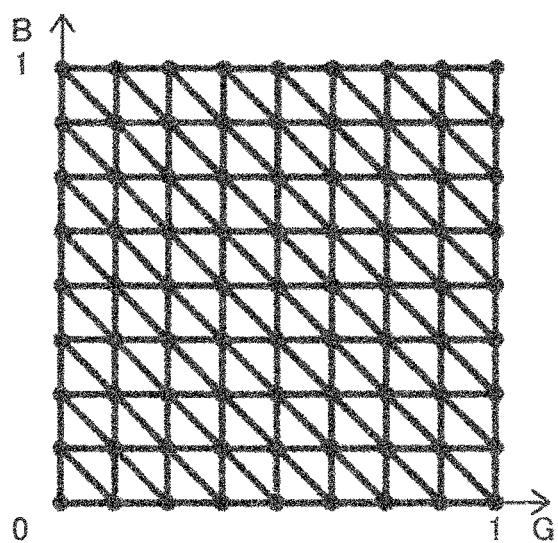
FIG. 11B shows an example of a pattern of line segments obtained in association with the color values in FIG. 10A, the pattern being different from the pattern in FIGS. 10B and 11A.

The gamut boundary line-segment obtaining unit 35a may obtain line segments indicated with thick lines, as shown in FIG. 11B, in S135. Specifically, the gamut boundary line-segment obtaining unit 35a may obtain "line segments having an endpoint at a color value in the ith row and jth column and an endpoint at a color value in the (i+1)th row and jth column", "line segments having an endpoint at a color value in the ith row and jth column and an endpoint at a color value in the ith row and (j+1)th column", and "line segments having an endpoint at a color value in the (i+1)th row and jth column and an endpoint at a color value in the ith row and (j+1)th column" in S135. In this description, the "i" and "j" are 1, 2, . . . 7, or 8.

Figure 11C:
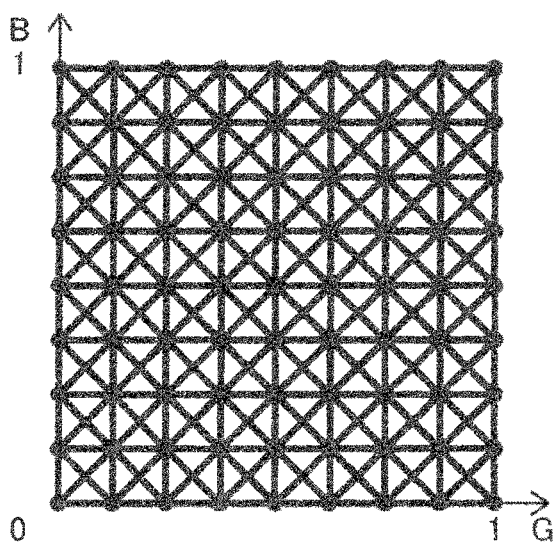
FIG. 11C shows an example of a pattern of line segments obtained in association with the color values in FIG. 10A, the pattern being different from the pattern in FIGS. 10B, 11A, and 11B.

The gamut boundary line-segment obtaining unit 35a may obtain line segments indicated with thick lines, as shown in FIG. 11C, in S135. Specifically, the gamut boundary line-segment obtaining unit 35a may obtain "line segments having an endpoint at a color value in the ith row and jth column and an endpoint at a color value in the (i+1)th row and jth column", "line segments having an endpoint at a color value in the ith row and jth column and an endpoint at a color value in the ith row and (j+1)th column", "line segments having an endpoint at a color value in the ith row and jth column and an endpoint at a color value in the (i+1)th row and (j+1)th column", and "line segments having an endpoint at a color value in the (i+1)th row and jth column and an endpoint at a color value in the ith row and (j+1)th column", in S135. In this description, the "i" and "j" are 1, 2, . . . 7, or 8.

The gamut boundary line-segment obtaining unit 35a can obtain patterns of "rectangular regions formed with a color value in the ith row and jth column, a color value in the (i+1)th row and jth column, a color value in the ith row and (j+1)th column, a color value in the (i+1)th row and (j+1)th column, but the pattern in FIG. 10B has no diagonal line segments in all the rectangular regions, the pattern in FIG. 11A has only right-up diagonal line segments in all the rectangular regions, the pattern in FIG. 11B has only right-down diagonal line segments in all the rectangular regions, and the pattern in FIG. 11C has both right-up and right-down diagonal line segments in all the rectangular regions. However, the gamut boundary line-segment obtaining unit 35a may adopt any one of the pattern having no diagonal line segments, the pattern having right-up diagonal line segments, the pattern having right-down diagonal line segments, and the pattern having both right-up and right-down diagonal line segments for each of the "rectangular regions formed with a color value in the ith row and jth column, a color value in the (i+1)th row and jth column, a color value in the ith row and (j+1)th column, a color value in the (i+1)th row and (j+1)th column. In this description, the "i" and "j" are 1, 2, . . . 7, or 8.

The foregoing description has been given for the case where the R-value is 0; however, similar line segments will be seen even if the R-value is 1, the G-value is 0 or 1, or the B-value is 0 or 1.

Secondly, the method of obtaining line segments by forming polygons with points of color values stored in S134 will be described.

The gamut boundary line-segment obtaining unit 35a forms polygons each having three points, for example, a point having an R-value of 0 and its neighboring two points, out of the points of the color values stored in S134, through Delaunay triangulation. Line segments can be obtained by extracting the line segments making up the polygons. The polygons share the boundary line segments with their neighboring polygons. It is therefore preferable for the gamut boundary line-segment obtaining unit 35a to remove the overlapped line segments of the neighboring polygons.

The foregoing description has been given for the case where the R-value is 0; however, similar line segments will be seen even if the R-value is 1, the G-value is 0 or 1, or the B-value is 0 or 1.

A description is given of how to obtain line segments when the color values stored in S134 are randomly arranged.

If the points of the color values stored in S134 do not include, for example, points having an R-value of 0, a G-value of 0, and a B-value of 0, points having an R-value of 0, a G-value of 0, and a B-value of 1, points having an R-value of 0, a G-value of 1, and a B-value of 0, or points having an R-value of 0, a G-value of 1, and a B-value of 1, the gamut boundary line-segment obtaining unit 35a adds the missing points. In addition, the gamut boundary line-segment obtaining unit 35a may add some points having a G-value of 0, some points having a G-value of 1, some points having a B-value of 0, and some points having a B-value of 1. Adding those points makes the gamut boundary, which is represented by the line segments obtained in S135, convex. After the point addition operations, the gamut boundary line-segment obtaining unit 35a forms polygons each using a point having an R-value of 0 with its neighboring two points through Delaunay triangulation. Line segments can be obtained by extracting the line segments making up the polygons. The polygons share the boundary line segments with their neighboring polygons. It is therefore preferable for the gamut boundary line-segment obtaining unit 35a to remove the overlapped line segments of the neighboring polygons.

The foregoing description has been given for the case where the R-value is 0; however, similar line segments will be seen even if the R-value is 1, the G-value is 0 or 1, or the B-value is 0 or 1.

Figure 12:
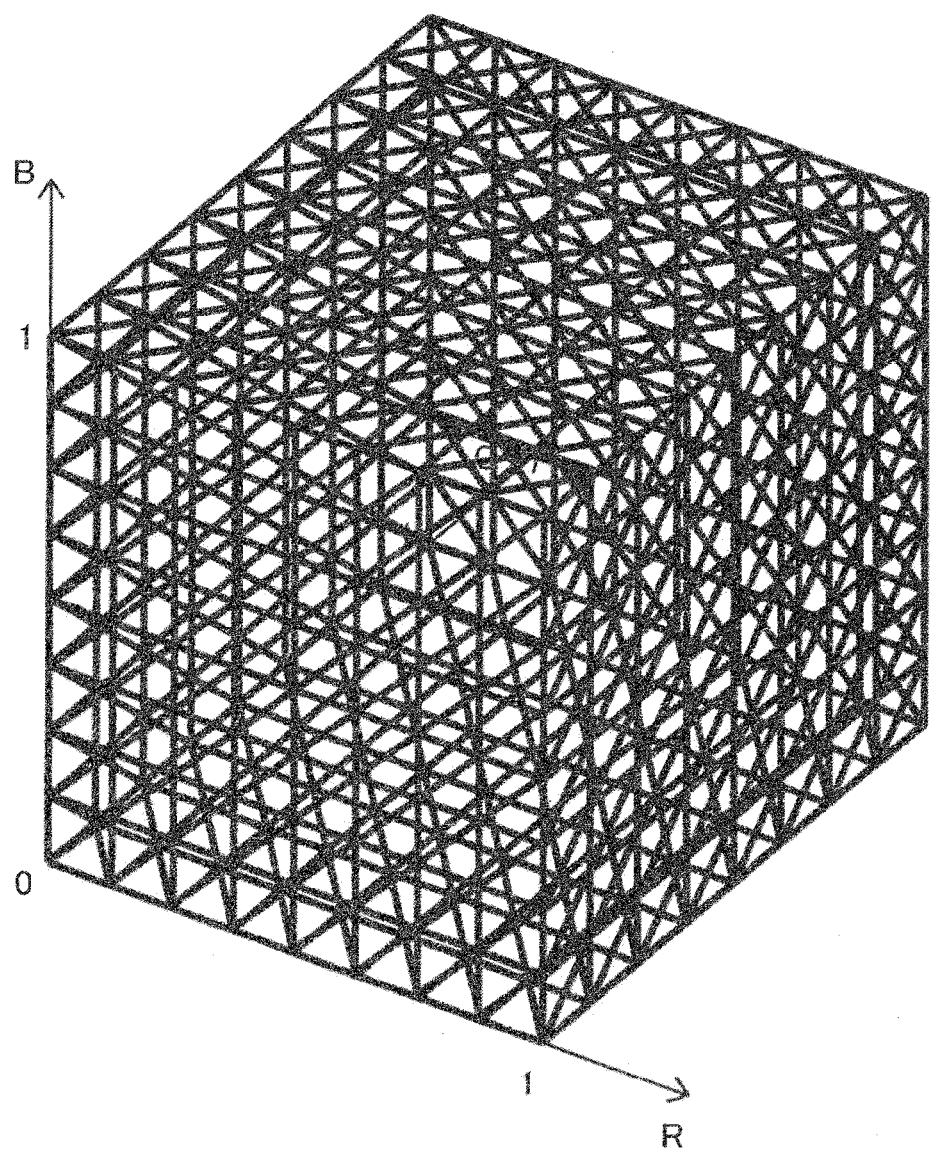
FIG. 12 illustrates line segments obtained by applying the pattern in FIG. 11A to the points in FIG. 8.

For example, if a chart, which contains patches corresponding to the color values of the colors on the outermost surfaces of the color gamut of the MFP 20, as shown in FIG. 8, is printed by the printer 24 in S132, the gamut boundary line-segment obtaining unit 35a applies the pattern shown in FIG. 11A to all the color values having an R-value of 0, an R-value of 1, a G-value of 0, a G-value of 1, a B-value of 0, and a B-value of 1, thereby obtaining line segments as shown in FIG. 12 in S135.

After S135, the gamut boundary line-segment obtaining unit 35a obtains line segments in a Lab color space corresponding to the line segments in the RGB color space obtained in S135 (S136). Specifically, the gamut boundary line-segment obtaining unit 35a converts the endpoints of the line segments in the RGB color space obtained in S135 into points in the Lab color space on the basis of the corresponding relationship stored in S134, thereby obtaining endpoints of the line segments in the Lab color space. The gamut boundary line-segment obtaining unit 35a obtains an equation for line segments in the Lab color space, based on the obtained endpoints in the Lab color space, by Expression 1. In Expression 1, {Li,ai,bi} denotes a point on a line segment, {Ls,as,bs} denotes a start point, which is one of the two endpoints of a line segment, and {Le,ae,be} denotes an ending point, which is the other point of the line segment. In addition, "t" is a parameter from 0 to 1.

$$\begin{pmatrix} L_i \\ a_i \\ b_i \end{pmatrix} = t * \begin{pmatrix} L_e - L_s \\ a_e - a_s \\ b_e - b_s \end{pmatrix} + \begin{pmatrix} L_s \\ a_s \\ b_s \end{pmatrix}$$ [Expression 1]

Figure 13:
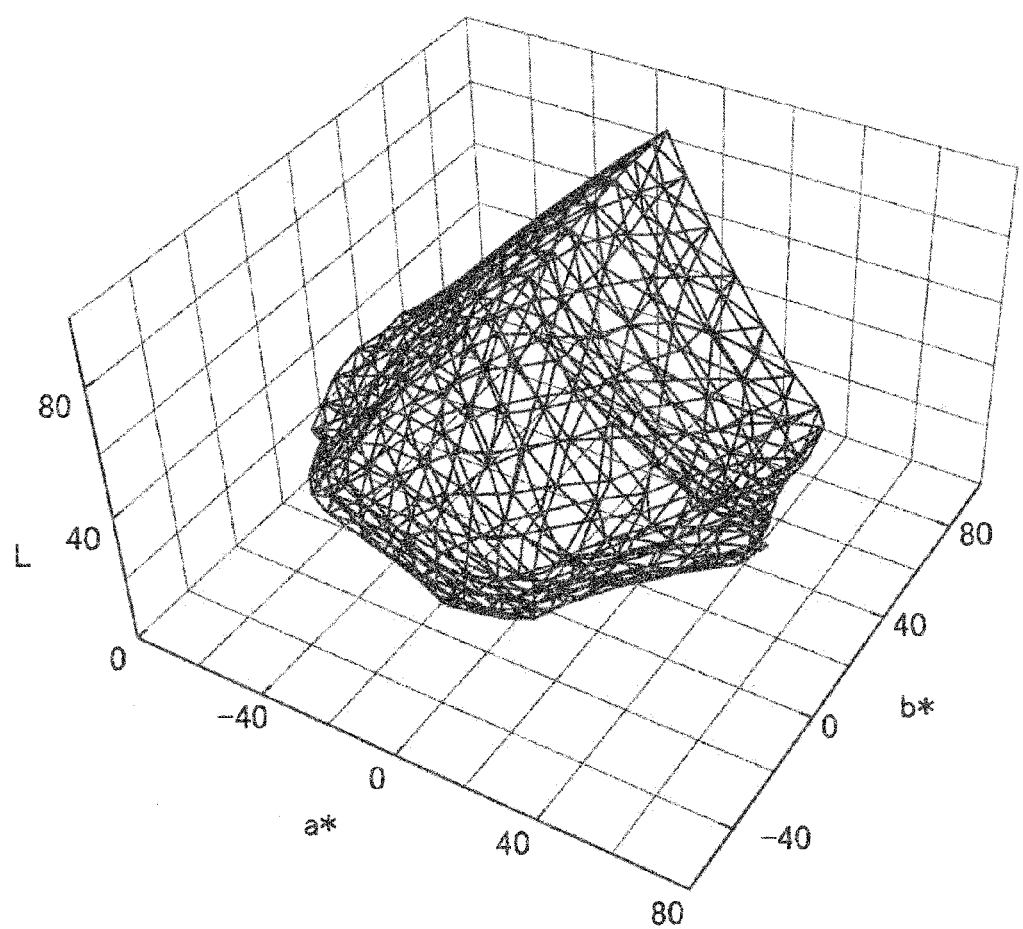
FIG. 13 shows an example of line segments in a Lab color space, corresponding to the line segments in FIG. 12.

For example, the gamut boundary line-segment obtaining unit 35a that has obtained the line segments shown in FIG. 12 in S135 can obtain line segments in the Lab color space as shown in FIG. 13 in S136.

It is preferable for the gamut boundary line-segment obtaining unit 35a to adopt a method of obtaining line segments in S135 involving application of a pattern in which the line segments intersect with each other only at the endpoints as shown in FIG. 10B, 11A or 11B, rather than a pattern in which the line segments intersect with each other at both the endpoints and the other positions as shown in FIG. 11C.

Figure 14A:
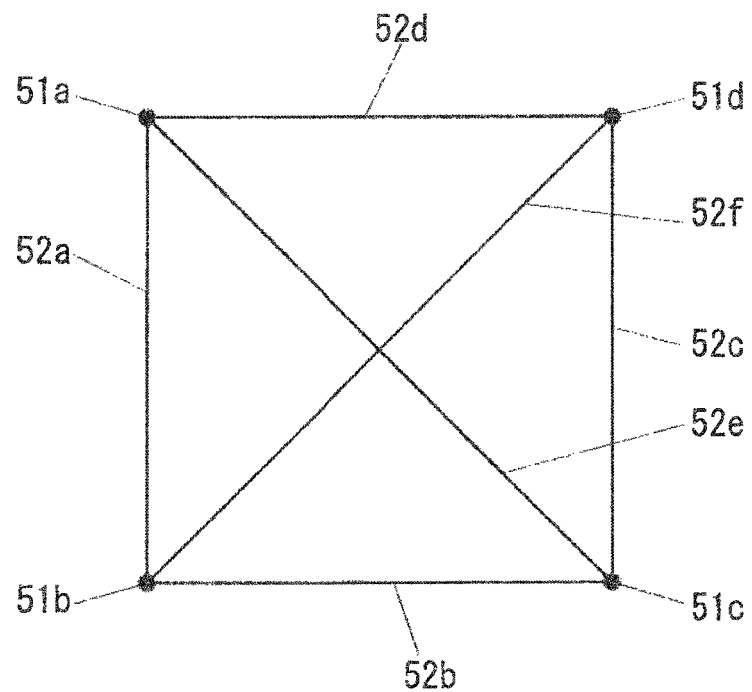
FIG. 14A shows an example of line segments in an RGB color space obtained in a gamut boundary line-segment obtaining process shown in FIG. 5.
Figure 14B:
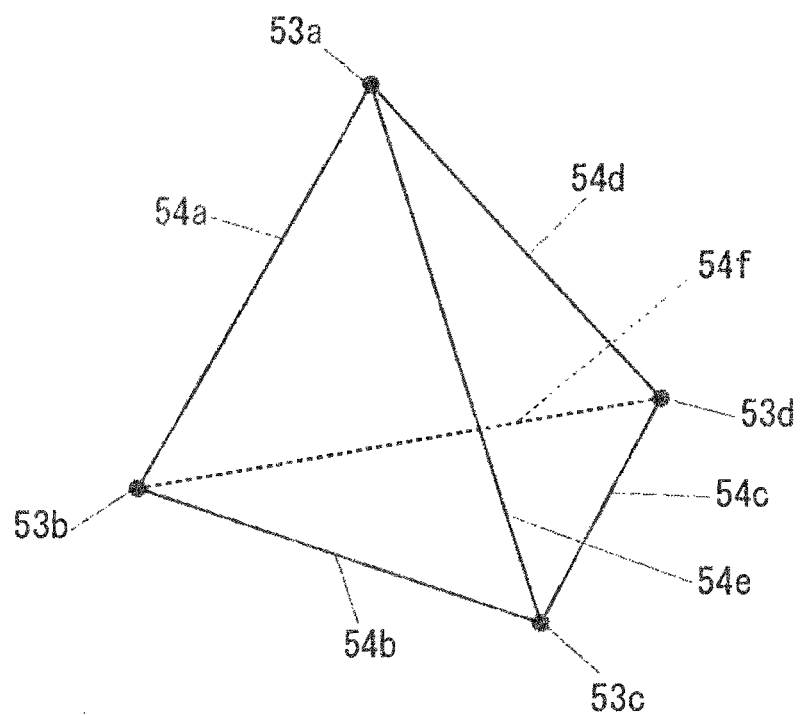
FIG. 14B shows an example of line segments in a Lab color space, corresponding to the line segments in FIG. 14A.

Given that line segments 52a, 52b, 52c, 52d, 52e, 52f are obtained in S135 based on points 51a, 51b, 51c and 51d present on a plane in an RGB color space as shown in FIG. 14A. The line segment 52e intersects the line segment 52f at a position other than their endpoints. The points 51a, 51b, 51c and 51d in the RGB color space in FIG. 14A correspond to, for example, points 53a, 53b, 53c and 53d in the Lab color space in FIG. 14B, respectively. In FIG. 14B, the points 53a, 53b, 53c and 53d are vertices of a tetrahedron. The line segments 54a, 54b, 54c, 54d, 54e, 54f correspond to the line segments 52a, 52b, 52c, 52d, 52e, 52f, respectively.

In FIG. 14B, the line segments 54a, 54b, 54c, 54d are baseline segments to construct the outermost surfaces of the color gamut of the MFP 20. However, the outermost surfaces of the color gamut of the MFP 20 are constructed by the points 53a, 53b, 53c and 53d. When a triangle formed by the points 53a, 53b and 53c and a triangle formed by the points 53a, 53c and 53d construct the outermost surfaces of the color gamut of the MFP 20, one of the line segment 54e and line segment 54f, in this case, only the line segment 54e serves as a baseline segment of the outermost surfaces of the color gamut of the MFP 20. Similarly, when the outermost surfaces of the color gamut of the MFP 20 are constructed by a triangle formed by the points 53a, 53b and 53d and a triangle formed by the points 53b, 53c and 53d, one of the line segment 54e and line segment 54f, in this case, only the line segment 54f serves as a baseline segment of the outermost surfaces of the color gamut of the MFP 20.

As described above, the method of obtaining line segments in S135 by applying a pattern in which the line segments intersect with each other at positions other than the endpoints as shown in FIG. 11C causes the gamut boundary line-segment obtaining unit 35a to obtain line segments other than line segments serving as baseline segments of the outermost surfaces of the color gamut of the MFP 20.

On the other hand, the method of obtaining line segments in S135 by applying a pattern in which the line segments intersect with each other only at the endpoints as shown in FIGS. 10B, 11A and 11B prevents the gamut boundary line-segment obtaining unit 35a from obtaining line segments other than line segments serving as baseline segments of the outermost surfaces of the color gamut of the MFP 20.

Therefore, it is more preferable for the gamut boundary line-segment obtaining unit 35a to adopt the method of obtaining line segments in S135 by applying a pattern in which the line segments intersect with each other only at the endpoints as shown in FIGS. 10B, 11A and 11B, rather than the pattern in which the line segments intersect with each other at both the end points and the other positions as shown in FIG. 11C.

However, if it is considered that the positional differences of the line segments 54e and 54f in FIG. 14B are very small with respect to the size of the entire outermost surfaces of the color gamut of the MFP 20, obtaining the line segments 54e and 54f as baseline segments of the outermost surfaces of the color gamut of the MFP 20 probably has little effect on the final obtainable cross-section boundary. Therefore, the gamut boundary line-segment obtaining unit 35a can obtain line segments by applying the pattern in which the line segments intersect with each other at the positions other than the endpoints as shown in FIG. 11C in S135.

Subsequent to completion of the operation in S136, the gamut boundary line-segment obtaining unit 35a terminates the gamut boundary line-segment obtaining process shown in FIG. 5.

Upon termination of the gamut boundary line-segments obtaining process in S101, the endpoint obtaining unit 35c executes an endpoint obtaining process shown in FIG. 4 to obtain the endpoints of cross-section boundary line segments (S102).

Figure 15:
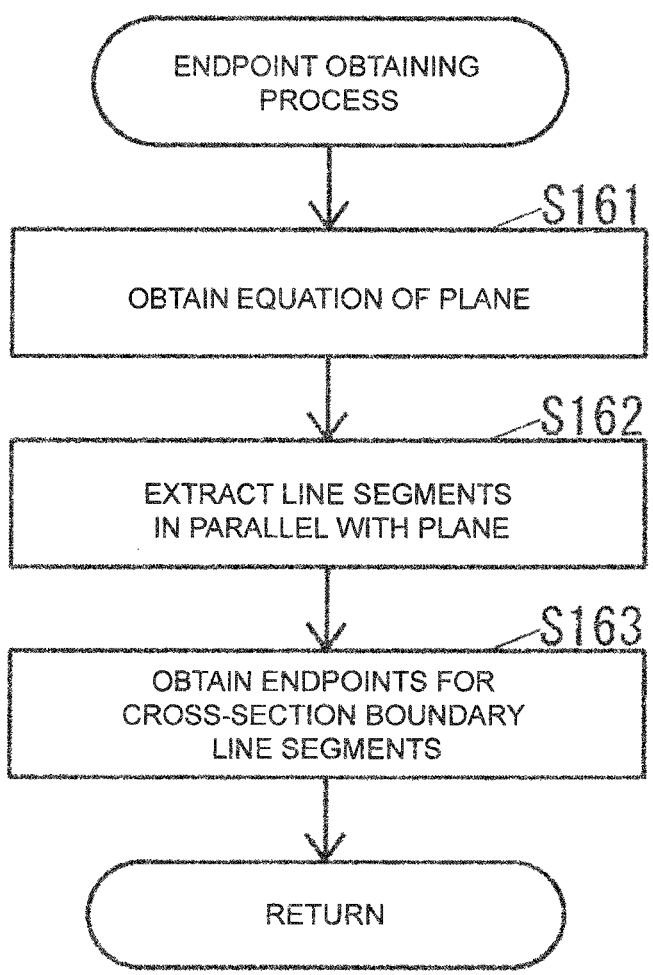
FIG. 15 is a flowchart of an endpoint obtaining process shown in FIG. 4.

FIG. 15 is a flowchart of the endpoint obtaining process shown in FIG. 4.

As shown in FIG. 15, the endpoint obtaining unit 35c obtains an equation of a plane (S161).

For example, if a user has already specified a plane containing a specified point X {Lx,ax,bx} and having constant lightness, or if it has been already determined to obtain boundary line segments of a cross-section taken by slicing the color gamut of the MFP 20 along a plane having lightness Lx, the planes are represented by an equation in Expression 2. Thus, the endpoint obtaining unit 35c obtains the equation in Expression 2 in S161.

$$L=L_x \quad \text{[Expression 2]}$$

If a user has already specified a plane containing a specified point X {Lx,ax,bx} and having a constant hue, the plane is represented by an equation in Expression 3. Specifically, the plane that contains the L axis can be uniquely defined as shown by Expression 3 based on three points: a black point K {0,0,0} present on the L axis; a white point W {100,0,0} present on the L axis; and a specified point X {Lx,ax,bx}. The equation in Expression 3 is represented as an equation in Expression 4. Resultantly, the endpoint obtaining unit 35c obtains the equation in Expression 4 in S161.

$$(\overrightarrow{XW} \times \overrightarrow{XK}) \cdot \{L,a,b\}=0 \quad \text{[Expression 3]}$$

$$ba_x=ab_x \quad \text{[Expression 4]}$$

If a user has already specified a plane having a specified hue angle Hd, or if it has been already determined to obtain boundary line segments of a cross-section taken by slicing the color gamut of the MFP 20 along a plane having the hue angle Hd, the planes are represented by an equation in Expression 5. Resultantly, the endpoint obtaining unit 35c obtains the equation in Expression 5 in S161.

$$b \cos [H_d] = a \sin [H_d] \quad \text{[Expression 5]}$$

If a user has already specified a plane containing a specified point X {Lx,ax,bx} and having a normal vector {p,q,r}, the plane is represented by an equation in Expression 6. Resultantly, the endpoint obtaining unit 35c obtains the equation in Expression 6 in S161.

$$p^*(L-L_x)+q^*(a-a_x)+r^*(b-b_x)=0 \quad \text{[Expression 6]}$$

If the aforementioned specified point specifies a color value in RGB format, the endpoint obtaining unit 35c may convert the RGB values into Lab values by referring to a conversion lookup table (LUT). Alternatively, the endpoint obtaining unit 35c may form a patch having the color value of the specified point specified in RGB format and print it by the printer 24 to measure the color value of the printed patch in Lab format and use the Lab value as the specified value.

After the operation in S161, the endpoint obtaining unit 35c searches the line segments obtained in S136 for line segments in parallel with the plane obtained in S161 to extract the parallel line segments (S162). The reason to extract the line segments in parallel with the plane is to avoid the occurrence of errors, such as processing halt caused by division by zero and endless calculation, in the subsequent process in S163. In addition, even if a line segment is in parallel with the plane obtained in S161, a computer may judge that the line segment is not in parallel with the plane due to its computing error. To avoid the error, the endpoint obtaining unit 35c extracts even line segments roughly in parallel with the plane obtained in S161 as being line segments of interest in S162.

After the operation in S162, the endpoint obtaining unit 35c finds points of intersection of the line segments obtained in S136 and the plane obtained in S161 to define the intersection points as endpoints of cross-section boundary line segments (S163). In S163, the endpoint obtaining unit 35c excludes the line segments extracted in S162.

Here is an example of how to obtain endpoints when the plane obtained in S161 is a plane represented by the equation in Expression 4.

A value of {Li,ai,bi} and a parameter t can be obtained by simultaneously solving an equation in Expression 7, which is based on the equation in Expression 4 representing the plane obtained in S161, and the equation in Expression 1 representing a line segments obtained in S136. When the parameter t is less than 0 or greater than 1, the value of {Li,ai,bi} is a point of intersection of a straight line including the line segment obtained in S136 and the plane obtained in S161, but not a point of intersection of the line segment obtained in S136 and the plane obtained in S161. Therefore, the endpoint obtaining unit 35c obtains a value of {Li,ai,bi} with a parameter t ranging from 0 to 1 as a coordinate of the point of intersection of the line segment obtained in S136 and the plane obtained in S161.

$$b_i a_x = a_i b_x \quad \text{[Expression 7]}$$

The above description is about an example where the plane obtained in S161 is represented by the equation in Expression 4; however, intersection points can be obtained in the same manner even if the plane obtained in S161 is a plane represented by an equation other than the equation in Expression 4.

Figure 16A:
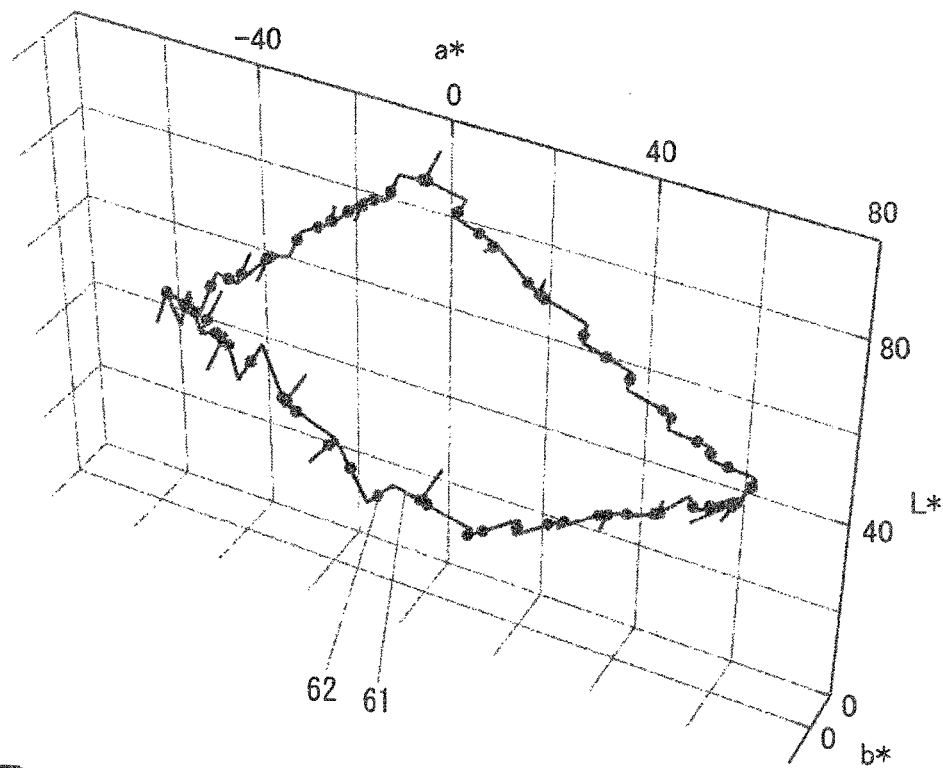
FIG. 16A shows an example of gamut boundary line segments when a plane obtained in the endpoint obtaining process in FIG. 15 is a plane with b=0, and intersection points of the plane and the color-gamut boundary line segments.
Figure 16B:
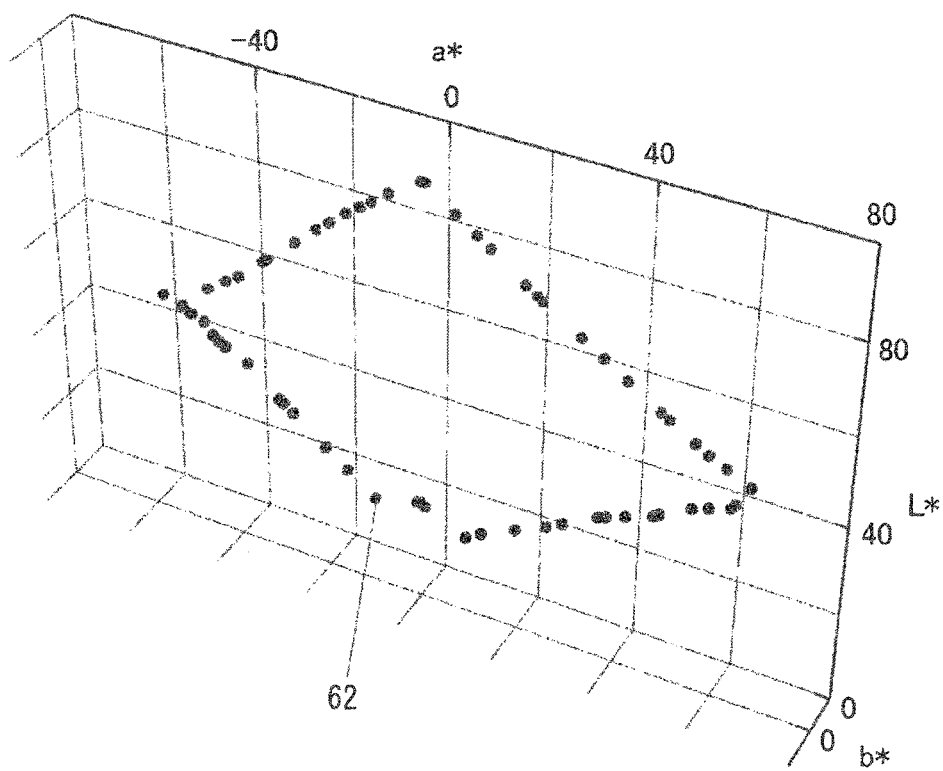
FIG. 16B shows an example of intersection points of the plane, which is obtained in the endpoint obtaining process in FIG. 15 and has b=0, and the color-gamut boundary line segments.

FIG. 16A shows an example of gamut boundary line segments 61 when the plane obtained in S161 is a plane with b=0, and intersection points 62 of the plane and the gamut boundary line segments 61. FIG. 16B shows an example of intersection points 62 of the plane with b=0 obtained in S161 and the gamut boundary line segments 61.

When the plane obtained in S161 is a plane with b=0, the endpoint obtaining unit 35c can obtain the intersection points 62, shown in FIGS. 16A and 16B, as endpoints of cross-section boundary line segments in S163.

Upon completion of the operation in S163, the endpoint obtaining unit 35c terminates the whole endpoint obtaining process.

As shown in FIG. 4, the cross-section boundary line-segment obtaining unit 35b executes a cross-section boundary line-segment obtaining process to obtain cross-section boundary line segments (S103) subsequent to completion of the endpoint obtaining process in S102.

Figure 17:
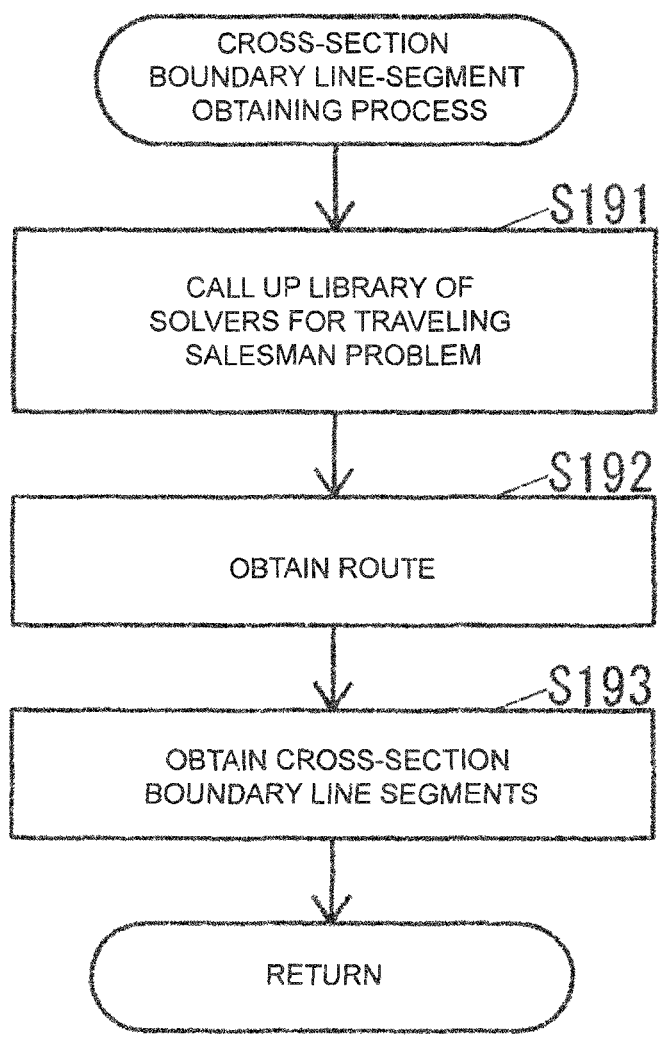
FIG. 17 is a flowchart of a cross-section boundary line-segment obtaining process shown in FIG. 4.

FIG. 17 is a flowchart of the cross-section boundary line-segment obtaining process shown in FIG. 4.

As shown in FIG. 17, the cross-section boundary line-segment obtaining unit 35b calls up a library of solvers for a traveling salesman problem (S191).

The cross-section boundary line-segment obtaining unit 35b obtains the shortest route passing through all the endpoints obtained in S163 only once, by using the library that is called up in S191 (S192).

Then, the cross-section boundary line-segment obtaining unit 35b obtains line segments that make up the route obtained in S192 as cross-section boundary line segments (S193).

Figure 18:
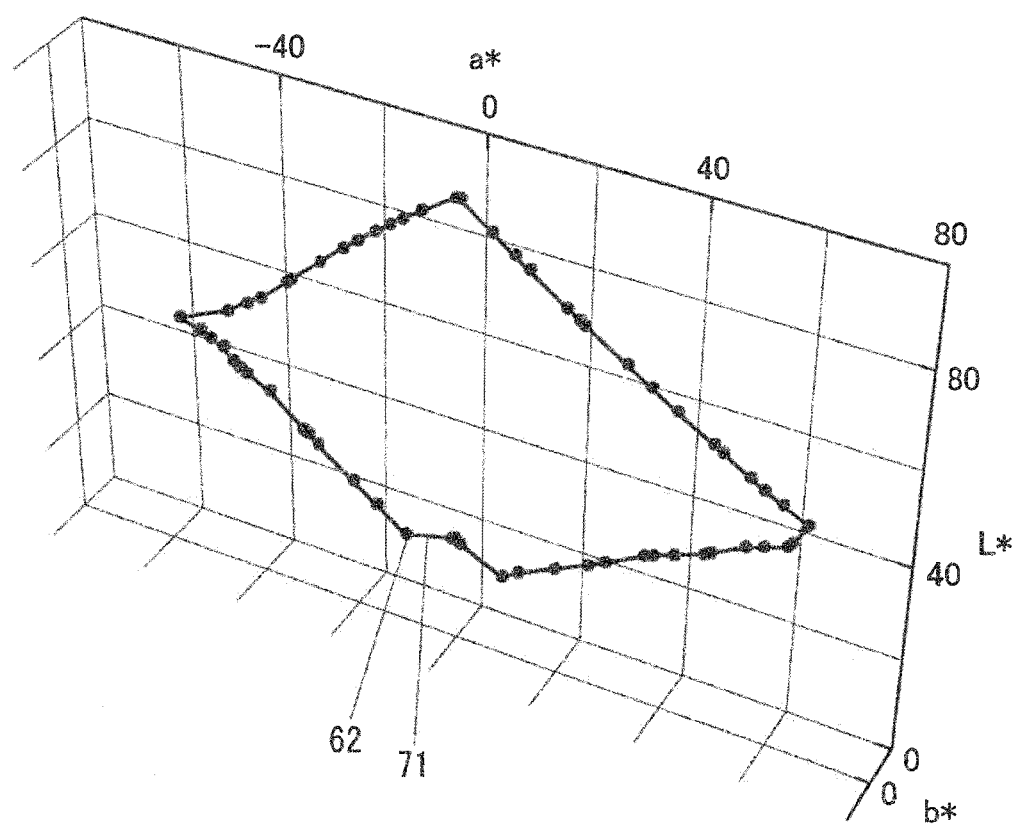
FIG. 18 shows an example of a cross-section boundary line segments obtained in association with the endpoints shown in FIG. 16B.

If, for example, endpoints of the cross-section boundary line segments as shown in FIG. 16B are obtained in S163, the cross-section boundary line-segment obtaining unit 35b can obtain cross-section boundary line segments 71 as shown in FIG. 18 in S193.

As shown in FIG. 17, the cross-section boundary line-segment obtaining unit 35b terminates the cross-section boundary line-segment obtaining process upon completion of the operation in S193.

The control unit 35 terminates its operations shown in FIG. 4 upon completion of the cross-section boundary line-segment obtaining process in S103.

The control unit 35 can perform various operations with the use of the cross-section boundary line segments obtained through the operations shown in FIG. 4. For example, the control unit 35 can display a cross-section boundary with cross-section boundary line segments on the display unit 32 and can determine whether a specified chromaticity value is inside or outside the cross-section boundary by running the In/Out-of-gamut determination program 34a.

As described above, cross-section boundary line segments obtained by the In/Out-of-gamut determination device 30, which are baseline segments of the boundary of a cross-section of a color gamut of an MFP 20, are line segments making up the shortest route passing through all points of intersection of gamut boundary line segments, which are baseline segments of the boundary of the color gamut, and a plane only once. Therefore, even if the cross-section obtained by slicing the color gamut of the MFP 20 along the plane is rough and jagged, the differences between the actual cross-section and the obtained cross-section can be reduced.

In addition, the In/Out-of-gamut determination device 30 obtains the route by means of the solvers for the traveling salesman problem (S192) that can reduce processing loads required to obtain the cross-section of the color gamut of the MFP 20 along a plane. The In/Out-of-gamut determination device 30 can dispense with the solvers for the traveling salesman problem to obtain the shortest route passing through all the endpoints, obtained in S163, only once.

The In/Out-of-gamut determination device 30 obtains a plane containing a specified point X {Lx,ax,bx} and having a constant hue by the equation in Expression 4, obtains points of intersection of the plane and the gamut boundary line segments as endpoints for cross-section boundary line segments, and obtains the cross-section boundary line segments associated with the endpoints by using a library of solvers for the traveling salesman problem. Therefore, the In/Out-of-gamut determination device 30 can obtain cross-section boundary line segments of a cross-section of the color gamut of the MFP 20 with a hue to which the specified point X {Lx,ax,bx} belongs without converting the Lab values into CHL (chroma, hue, lightness) values one by one.

In this embodiment, the process in S161 is performed after the process in S101; however, the process in S161 can be performed before the process in S101.

The "computer" and "color-gamut cross-section obtaining apparatus" in this disclosure correspond to the In/Out-of-gamut determination device 30 that is a standalone device separated from the MFP 20; however, the MFP 20 itself can have a function of the In/Out-of-gamut determination device 30.

The "image forming apparatus" in this disclosure is embodied by an MFP in this embodiment; however, the image forming apparatus can be a printing specific apparatus or other types of image forming apparatuses.

What is claimed is:

1. A method for obtaining a cross-section of a color gamut of an image forming apparatus by slicing the color gamut along a plane and making a determination therefrom, the method comprising:
  obtaining gamut boundary line segments that are baseline segments of a boundary of the color gamut of the image forming apparatus;
  obtaining endpoints for cross-section boundary line segments, the obtained endpoints being points of intersection of the obtained gamut boundary line segments and the plane;
  obtaining the cross-section boundary line segments that are baseline segments for a boundary of the cross-section of the color gamut of the image forming apparatus, the obtained cross-section boundary line segments being line segments defining a route that is a shortest route passing through all of the obtained endpoints only once;
  displaying a cross-section boundary with the obtained cross-section boundary line segments; and
  determining whether a specified chromaticity value is inside or outside the cross-section of the color gamut of the image forming apparatus using the obtained cross-section boundary line segments,
  wherein obtaining the gamut boundary line segments further comprises:
  obtaining endpoints of line segments in a Lab color space by converting the endpoints of the line segments in a RGB color space into points in the Lab color space; and
  obtaining the gamut boundary line segments in the Lab color space, based on obtained endpoints in the Lab color space, by a formula 1, {Li,ai,bi} denoting a point on a line segment, {Ls,as,bs} denoting a start point, which is one of the two endpoints of a line segment, {Le,ae,be} denoting an ending point, which is the other point of the line segment, and "t" is a parameter from 0 to 1; and $$\begin{pmatrix} L_i \\ a_i \\ b_i \end{pmatrix} = t * \begin{pmatrix} L_e - L_s \\ a_e - a_s \\ b_e - b_s \end{pmatrix} + \begin{pmatrix} L_s \\ a_s \\ b_s \end{pmatrix} \quad \text{[Formula 1]}$$

wherein obtaining the endpoints for the cross-section boundary line segments further comprises:

obtaining a formula 2, in one of the cases where, (i) a user has already specified a plane including a specified point X {Lx,ax,bx} and having a constant lightness, or (ii) it has been already determined to obtain the cross-section boundary line segments taken by slicing a color gamut of the image forming apparatus along a plane having a lightness Lx, the plane is represented by the formula 2;

$$L=L_x \quad \text{[Formula 2]}$$

obtaining a formula 4, in the case where the user has already specified a plane including the specified point X {Lx,ax,bx} and having a constant hue, the plane is represented by a formula 3, and is specified by three points: a black point K {0,0,0} present on an L axis; a white point W {100,0,0} present on the L axis; and the specified point X {Lx,ax,bx}, then the formula 3 is represented as the formula 4;

$$(\overrightarrow{XW} \times \overrightarrow{XK}) \cdot \{L,a,b\}=0 \quad \text{[Formula 3]}$$

$$ba_x = ab_x \quad \text{[Formula 4]}$$

obtaining a formula 5, in one of the cases where (i) the user has already specified a plane having a specified hue angle Hd, or (ii) it has been already determined to obtain the cross-section boundary line segments taken by slicing the color gamut of the image forming apparatus along a plane having the hue angle Hd, the plane is represented by the formula 5; and $$b \cos[H_d] = a \sin[H_d] \quad \text{[Formula 5]}$$

obtaining a formula 6, in the case where the user has already specified a plane including the specified point X {Lx,ax,bx} and having a normal vector {p,q,r}, the plane is represented by the formula 6, $$p^*(L-L_x)+q^*(a-a_x)+r^*(b-b_x)=0 \quad \text{[Formula 6]}$$

2. The method according to claim 1, wherein the route that is the shortest route passing through all of the obtained endpoints is obtained by solvers for a traveling salesman problem.

3. An apparatus for obtaining a cross-section of a color gamut of an image forming apparatus by slicing the color gamut along a plane and making a determination therefrom, the apparatus comprising:
a display device;
a hard disk drive (HDD) that stores an In/Out-of-gamut determination program; and
a central processing unit (CPU) that executes the In/Out-of-gamut determination program stored in the HDD to function as a gamut boundary line-segment obtainer, an endpoint obtainer and a cross-section boundary line-segment obtainer, the CPU being configured to:
obtain, via the gamut boundary line-segment obtainer, gamut boundary line segments, which serve as baseline segments for a boundary of the color gamut of the image forming apparatus, wherein the gamut boundary line-segment obtainer:
obtains endpoints of line segments in a Lab color space by converting the endpoints of the line segments in a RGB color space into points in the Lab color space; and
obtains the gamut boundary line segments in the Lab color space, based on obtained endpoints in the Lab color space, by a formula 1, {Li,ai,bi} denoting a point on a line segment, {Ls,as,bs} denoting a start point, which is one of the two endpoints of a line segment, {Le,ae,be} denoting an ending point, which is the other point of the line segment, and "t" is a parameter from 0 to 1;

$$\begin{pmatrix} L_i \\ a_i \\ b_i \end{pmatrix} = t * \begin{pmatrix} L_e - L_s \\ a_e - a_s \\ b_e - b_s \end{pmatrix} + \begin{pmatrix} L_s \\ a_s \\ b_s \end{pmatrix} \quad \text{[Formula 1]}$$

obtain, via the endpoint obtainer, endpoints for cross-section boundary line segments, the obtained endpoints being points of intersection of the obtained gamut boundary line segments and the plane, wherein:
in one of the cases where, (i) a user has already specified a plane including a specified point X {Lx,ax,bx} and having a constant lightness, or (ii) it has been already determined to obtain the cross-section boundary line segments taken by slicing a color gamut of the image forming apparatus along a plane having a lightness Lx, the plane is represented by a formula 2, then, the endpoint obtainer obtains the formula 2;

$$L=L_x \quad \text{[Formula 2]}$$

in the case where the user has already specified a plane including the specified point X {Lx,ax,bx} and having a constant hue, the plane is represented by a formula 3, and is specified by three points: a black point K {0,0,0} present on an L axis; a white point W {100,0,0} present on the L axis; and the specified point X {Lx,ax,bx}, then the formula 3 is represented as a formula 4, resultantly, the endpoint obtainer obtains the formula 4;

$$(\overrightarrow{XW} \times \overrightarrow{XK}) \cdot [L,a,b]=0 \quad \text{[Formula 3]}$$

$$ba_x = ab_x \quad \text{[Formula 4]}$$

in one of the cases where (i) the user has already specified a plane having a specified hue angle Hd, or (ii) it has been already determined to obtain the cross-section boundary line segments taken by slicing the color gamut of the image forming apparatus along a plane having the hue angle Hd, the plane is represented by a formula 5, then, the endpoint obtainer obtains the formula 5; and $$b \cos[H_d] = a \sin[H_d] \quad \text{[Formula 5]}$$

in the case where the user has already specified a plane including the specified point X {Lx,ax,bx} and having a normal vector {p,q,r}, the plane is represented by a formula 6, then, the endpoint obtainer obtains the formula 6;

$$p^*(L-L_x)+q^*(a-+a_x)+r^*(b-b_x)=0 \quad \text{[Formula 6]}$$

obtain, via the cross-section boundary line-segment obtainer, the cross-section boundary line segments, which serve as baseline segments for a boundary of the cross-section of the color gamut of the image forming apparatus, the obtained cross-section boundary line segments being line segments defining a route that is a shortest route passing through all of the obtained endpoints only once;
display on the display device, via the In/Out-of-gamut determination program, a cross-section boundary with the obtained cross-section boundary line segments; and
determine, via the In/Out-of-gamut determination program, whether a specified chromaticity value is inside or outside of the cross-section of the color gamut of the image forming apparatus using the obtained cross-section boundary line segments.

4. A non-transitory computer-readable recording medium that stores an In/Out-of-gamut determination program for obtaining a cross-section of a color gamut of an image forming apparatus by slicing the color gamut along a plane and making a determination therefrom, the In/Out-of-gamut determination program which, when executed by a central processing unit (CPU), causes the CPU to (i) function as a gamut boundary line-segment obtainer, an endpoint obtainer and a cross-section boundary line-segment obtainer, and (ii) perform operations comprising:

obtain, via the gamut boundary line-segment obtainer, gamut boundary line segments, which serve as baseline segments for a boundary of the color gamut of the image forming apparatus, wherein the gamut boundary line-segment obtainer:

obtains endpoints of line segments in a Lab color space by converting the endpoints of the line segments in a RGB color space into points in the Lab color space; and obtains the gamut boundary line segments in the Lab color space, based on obtained endpoints in the Lab color space, by a formula 1, $\{L_i,a_i,b_i\}$ denoting a point on a line segment, $\{L_s,a_s,b_s\}$ denoting a start point, which is one of the two endpoints of a line segment, $\{L_e,a_e,b_e\}$ denoting an ending point, which is the other point of the line segment, and "t" is a parameter from 0 to 1;

$$\begin{pmatrix} L_i \\ a_i \\ b_i \end{pmatrix} = t * \begin{pmatrix} L_e - L_s \\ a_e - a_s \\ b_e - b_s \end{pmatrix} + \begin{pmatrix} L_s \\ a_s \\ b_s \end{pmatrix} \quad \text{[Formula 1]}$$

obtain, via the endpoint obtainer, endpoints for cross section boundary line segments, the obtained endpoints being points of intersection of the obtained gamut boundary line segments and the plane, wherein:

in one of the cases where, (i) a user has already specified a plane including a specified point X $\{L_x,a_x,b_x\}$ and having a constant lightness, or (ii) it has been already determined to obtain the cross-section boundary line segments taken by slicing a color gamut of the image forming apparatus along a plane having a lightness Lx, the plane is represented by a formula 2, then, the endpoint obtainer obtains the formula 2;

$$L=L_x \quad \text{[Formula 2]}$$

in the case where the user has already specified a plane including the specified point X $\{L_x,a_x,b_x\}$ and having a constant hue, the plane is represented by a formula 3, and is specified by three points: a black point K $\{0,0,0\}$ present on an L axis; a white point W $\{100,0,0\}$ present on the L axis; and the specified point X $\{L_x,a_x,b_x\}$, then the formula 3 is represented as a formula 4, resultantly, the endpoint obtainer obtains the formula 4;

$$(\overrightarrow{XW} \times \overrightarrow{XK}) \cdot \{L,a,b\} = 0 \quad \text{[Formula 3]}$$

$$ba_x = ab_x \quad \text{[Formula 4]}$$

in one of the cases where (i) the user has already specified a plane having a specified hue angle Hd, or (ii) it has been already determined to obtain the cross-section boundary line segments taken by slicing the color gamut of the image forming apparatus along a plane having the hue angle Hd, the plane is represented by a formula 5, then, the endpoint obtains the formula 5; and $$b \operatorname{Cos}[H_d] = a \operatorname{Sin}[H_d] \quad \text{[Formula 5]}$$

in the case where the user has already specified a plane including the specified point X $\{L_x,a_x,b_x\}$ and having a normal vector $\{p,q,r\}$, the plane is represented by a formula 6, then, the endpoint obtainer obtains the formula 6;

$$p*(L-L_x)+q*(a-a_x)+r*(b-b_x)=0 \quad \text{[Formula 6]}$$

obtain, via the cross-section boundary line-segment obtainer, the cross-section boundary line segments, which serve as baseline segments for a boundary of the cross-section of the color gamut of the image forming apparatus, the obtained cross-section boundary line segments being line segments defining a route that is a shortest route passing through all of the obtained endpoints only once;

display, via the In/Out-of-gamut determination program, a cross-section boundary with the obtained cross-section boundary line segments; and determine, via the In/Out-of-gamut determination program, whether a specified chromaticity value is inside or outside of the cross-section of the color gamut of the image forming apparatus using the obtained cross-section boundary line segments.

\* \* \* \* \*